(12) United States Patent   (10) Patent No.: US 7,515,814 B2
Arai et al.   (45) Date of Patent: Apr. 7, 2009

(54) REPRODUCING APPARATUS AND REPRODUCING METHOD FOR VIDEO AND AUDIO DATA PAIRED AS GROWTH RINGS

(75) Inventors: Takeharu Arai, Kanagawa (JP); Shigetaka Nagatani, Kanagawa (JP)

(73) Assignee: Sony Corporation, Tokyo (JP)

( * ) Notice: Subject to any disclaimer, the term of this patent is extended or adjusted under 35 U.S.C. 154(b) by 548 days.

(21) Appl. No.: 11/063,456

(22) Filed: Feb. 23, 2005

(65) Prior Publication Data

US 2005/0213943 A1   Sep. 29, 2005

(30) Foreign Application Priority Data

Feb. 24, 2004   (JP)   ............................. 2004-047303

(51) Int. Cl.
*H04N 5/85* (2006.01)
(52) U.S. Cl. ...................................... 386/105; 386/126
(58) Field of Classification Search .................. 386/96, 386/125, 126, 124, 98, 104, 106; 369/124.14, 369/13.11, 47.32; 714/797
See application file for complete search history.

(56) References Cited

U.S. PATENT DOCUMENTS

| 5,446,724 A | | 8/1995 | Tabe et al. |
| 5,768,236 A | * | 6/1998 | Kihara ................... 369/124.14 |
| 6,477,123 B1 | * | 11/2002 | Hutter ..................... 369/47.32 |
| 6,981,205 B2 | * | 12/2005 | Fukushima et al. ......... 714/797 |

FOREIGN PATENT DOCUMENTS

| EP | 0 831 647 | | 3/1998 |
| EP | 1 420 583 | | 5/2004 |
| JP | 5-6575 | | 1/1993 |
| JP | 5-114280 | | 5/1993 |
| JP | 5-307834 | | 11/1993 |
| JP | 8-106766 | | 4/1996 |
| JP | 9-73299 | | 3/1997 |
| JP | 10-208449 | | 8/1998 |
| JP | 11-88829 | | 3/1999 |
| JP | 2001-202698 | | 7/2001 |
| JP | 2001-243716 | | 9/2001 |
| JP | 2002-208257 | | 7/2002 |
| JP | 2004-5895 | | 1/2004 |
| JP | 2004-180288 | | 6/2004 |
| WO | WO 02/43383 | * | 5/2002 |

* cited by examiner

*Primary Examiner*—David E Harvey
(74) *Attorney, Agent, or Firm*—Frommer Lawrence & Haug LLP; William S. Frommer; Thomas F. Presson

(57) ABSTRACT

A system and method that permits audio data for each unit reproduction duration to be read from a disc-shaped recording medium and stored in a RAM. The audio data that are read from the RAM are transferred to a memory of a digital signal processor (DSP) and stored therein. When audio data are reproduced at for example 35 times speed, audio data for each unit reproduction duration (for example every 60 frames) are transferred to the memory of the DSP. Addresses are successively arranged in the memory of the DSP and the data are written to the addresses. Each sample of audio data stored in the memory of the DSP is read. As a result, a sound is reproduced without a break or other undesired disruption.

24 Claims, 25 Drawing Sheets

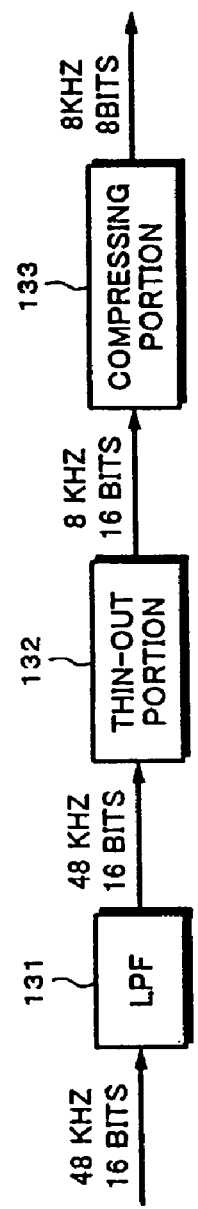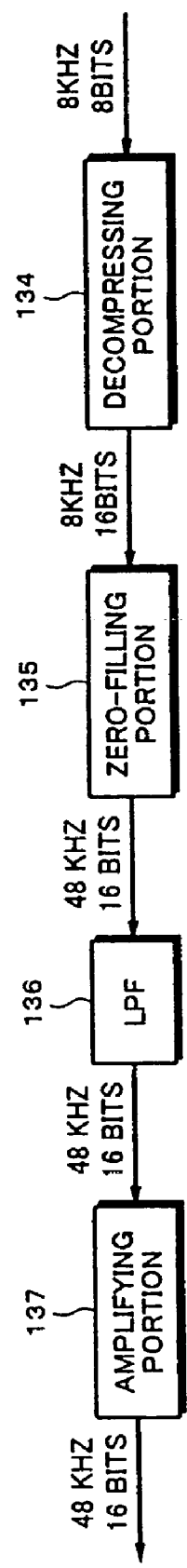

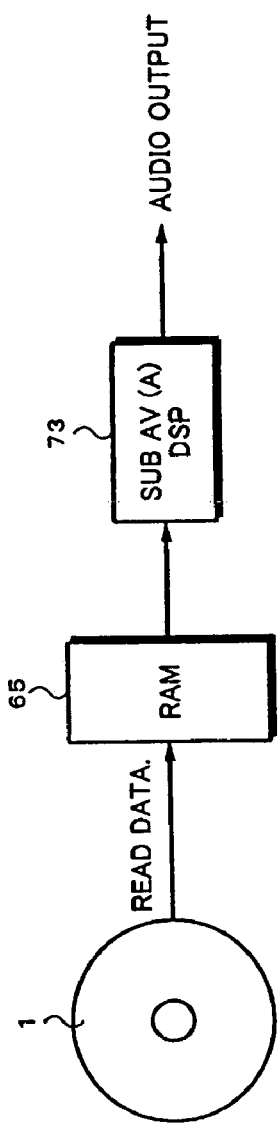
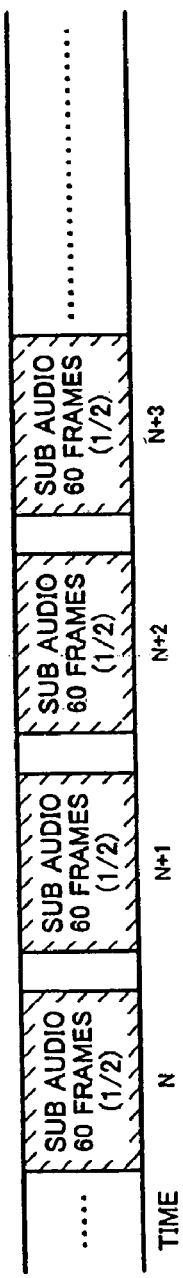
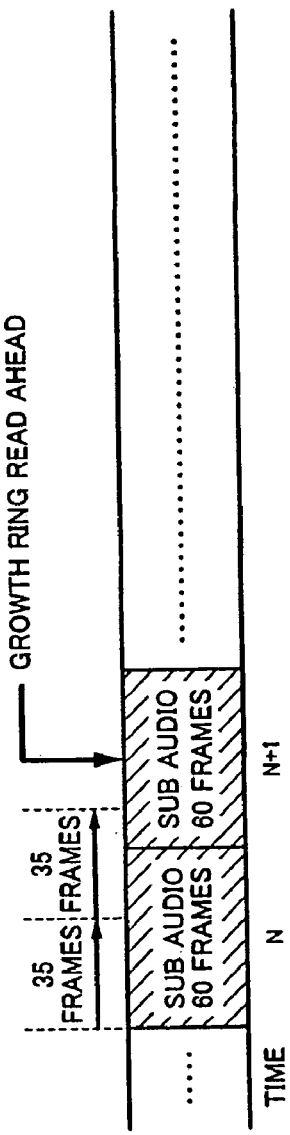
*Fig. 20*
*Fig. 21*
*Fig. 22*

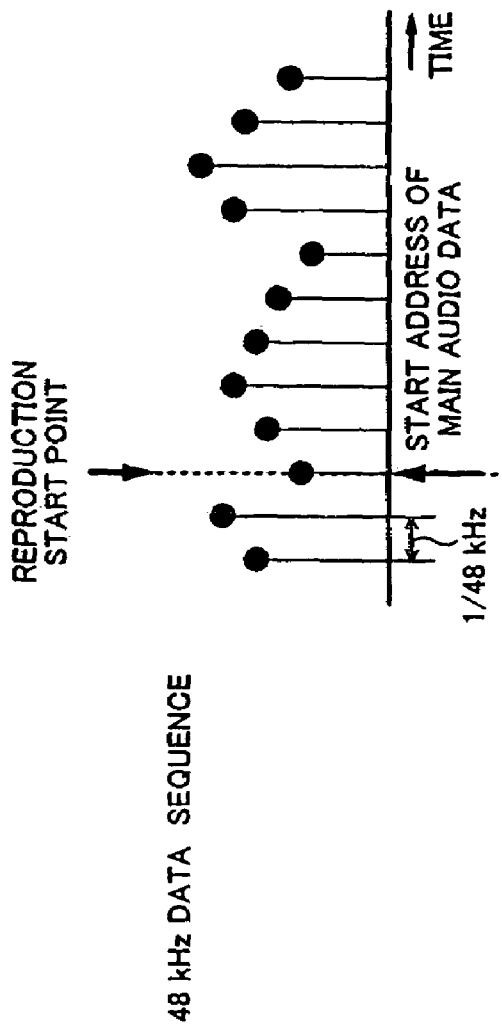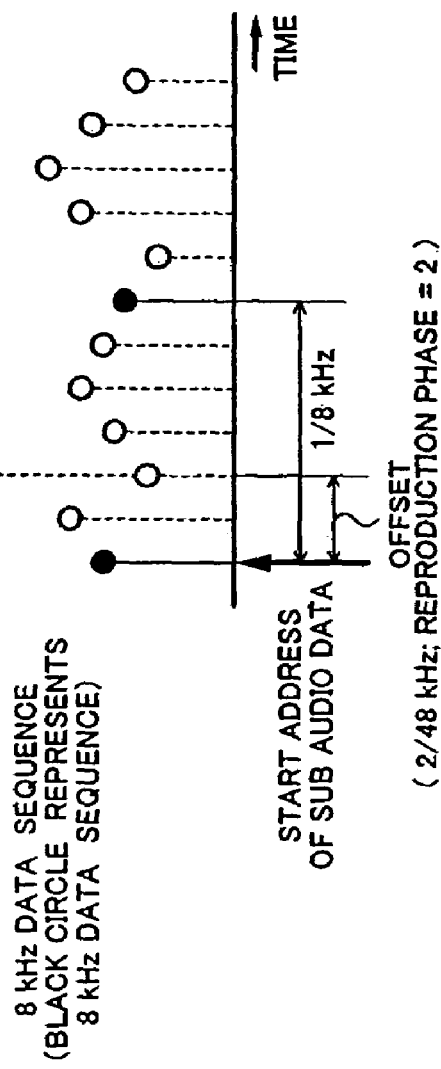
Fig. 27A
Fig. 27B

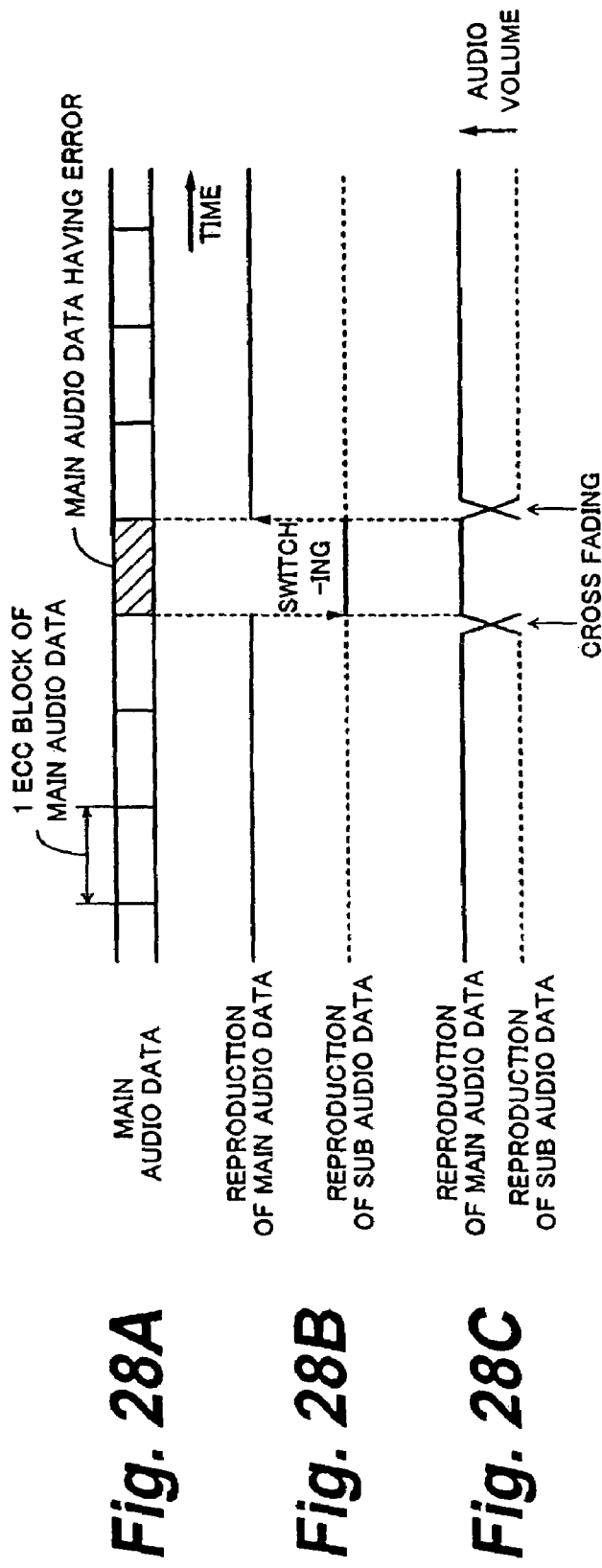

REPRODUCING APPARATUS AND REPRODUCING METHOD FOR VIDEO AND AUDIO DATA PAIRED AS GROWTH RINGS

BACKGROUND

1. Field of the Invention

The present invention relates generally to a reproducing apparatus and a reproducing method.

2. Background Discussion

Devices used in a broadcasting station, for example, video cassette recorders (VCRs), which record video data and audio data onto and from a tape shaped recording medium, have been developed. On the tape shaped recording medium, specifically a so-called video tape, recording tracks are formed by a helical scanning method. When a conventional VCR reproduces data from the video tape, a reproducing head traces the recording tracks, in parallel, from the beginning of the tape to the end of the tape so as to successively read data from the tape.

The VCR can reproduce data from the tape at variable speeds that are different from the traveling speed at which data are recorded on the tape. When the VCR reproduces data form the tape at high speed, the VCR increases the traveling speed of the tape from the traveling speed at which the VCR records data on the tape. When the VCR reproduces data from the tape at low speed, the VCR decreases the traveling speed of the tape from the traveling speed at which the VCR records data on the tape.

One conventional approach is described in Japanese Patent Laid-Open Publication No. 2001-250332.

However, while retrieving recorded data from a storage medium is a common practice, it would be an advancement in the art to provide a reproducing apparatus that enabled a user to listen to high quality music selections while data is being retrieved from a storage medium.

SUMMARY OF THE INVENTION

Therefore, in order to address drawbacks in the stat of the art, the present invention relates to a reproducing apparatus and a reproducing method that allow "listenable" and high quality sounds to be output when data is searched in a variable speed reproducing operation.

Accordingly, one embodiment of the present invention is directed to a reproducing apparatus for reproducing video data and audio data that are paired as growth rings, each growth ring corresponding to a reproduction time zone for a unit reproduction duration, the reproducing apparatus comprising: first storing means for storing audio data read from the disc-shaped recording medium for the unit reproduction duration. Second storing means store audio data, the audio data being read as samples from the second storing means, wherein the audio data stored in the first storing means are transferred for the unit reproduction duration to the second storing means. Successive addresses are arranged in the second storing means and the audio data is written to the successive addresses.

Another embodiment of the present invention is directed to a reproducing method for reproducing video data and audio data that are paired as growth rings, each growth ring corresponding to a reproduction time zone for a unit reproduction duration, the reproducing method comprising the steps of: (a) storing audio data read from the disc-shaped recording medium for the unit reproduction duration to a first storing device; and (b) storing audio data to a second storing device, the audio data being read as samples from the first storing device. The audio data stored in the first storing device are transferred for the unit reproduction duration to the second storing device, successive addresses being arranged in the second storing device, the audio data being written to the successive addresses.

Thus, when audio data that are separated need to be connected for the variable speed reproducing operation, a sound can be successively output without a break, pause or other undesired disruption.

As describe above, according to the present invention, a reproducing apparatus and a reproducing method that allow listenable and high quality sounds to be reproduced from separated audio data that may be connected in, for example, a variable speed reproducing mode can be provided.

The following detailed description of a best mode embodiment thereof, as illustrated in the accompanying drawings will provide additional details on the implementation of the invention.

BRIEF DESCRIPTION OF THE DRAWINGS

The invention will become more fully understood from the following detailed description, taken in conjunction with the accompanying drawings, wherein similar reference numerals denote similar portions.

FIG. 15 is a schematic diagram showing the structure for generating sub audio data.

FIG. 16 is a schematic diagram showing the structure for converting sub audio data into reproduction audio data.

FIG. 20 is a schematic diagram showing a flow of sub audio data that is reproduced.

FIG. 21 is a schematic diagram showing a mapping process for sub audio data to a RAM.

FIG. 22 is a schematic diagram showing the arrangement of audio data in a DSP memory.

FIG. 27A and FIG. 27B are timing diagrams showing an operation for giving an offset to the start address of sub audio data.

FIG. 28A, FIG. 28B, and FIG. 28C are timing diagrams showing a concealing process for main audio data using sub audio data.

DETAILED DESCRIPTION OF THE PREFERRED EMBODIMENTS

A variable speed reproducing function is convenient for searching recorded data for a user's desired sounds and pictures. For example, a news staff member of a television station could quickly search for edit points in recorded data. Thus, it would be advantageous for a VCR camera and a VCR used for editing to have advanced variable speed reproducing functions to enable a user to quickly search recorded data.

Figure 1:
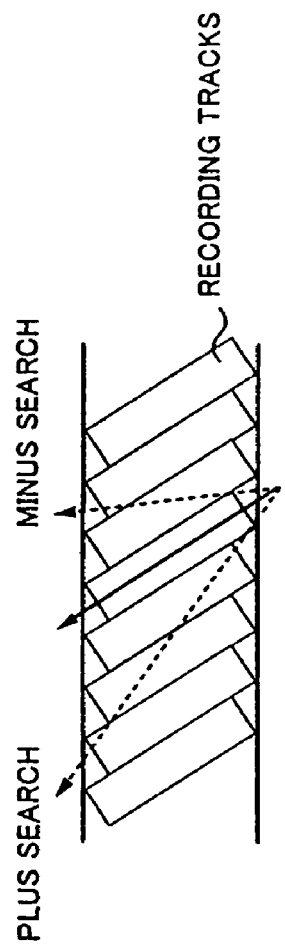
FIG. 1 is a schematic diagram showing a path of a reproducing head of a VCR on a video tape in a reproducing operation and variable speed reproducing operations.

Next, a variable speed reproducing operation of a VCR will be described. FIG. 1 shows the paths of a reproducing head of the VCR against a video tape in a normal reproducing operation mode and a variable speed reproducing operation mode of the VCR. When VCR normally reproduces data from the tape at the same speed as the VCR records data onto the tape, as denoted by an arrowed solid line shown in FIG. 1, a reproducing head parallelly traces recording tracks. In contrast, when the VCR reproduces data form the tape at high speed, the reproducing head traces recording tracks with a path as denoted by an arrowed dotted line on the plus search side shown in FIG. 1. On the other hand, when the VCR reproduces data at low speed, the reproducing head traces recording tracks with a path as denoted by an arrowed dotted line on the minus search side shown in FIG. 1.

Thus, since the reproducing head of the rotating drum of the conventional VCR cannot trace recording tracks of the tape in parallel in the variable speed reproducing mode, the head cannot obtain all data. For example, in the five times speed reproducing mode, one trace of the reproducing head spans five recorded tracks and obtains only partial data for each of the five tracks, such that five normal-speed scans worth of data is sampled via a single high-speed scan. In addition, since data that are obtained depend on the path of the reproducing head, it is difficult to improve the sound quality of data obtained in the variable speed reproducing mode.

Figure 2:
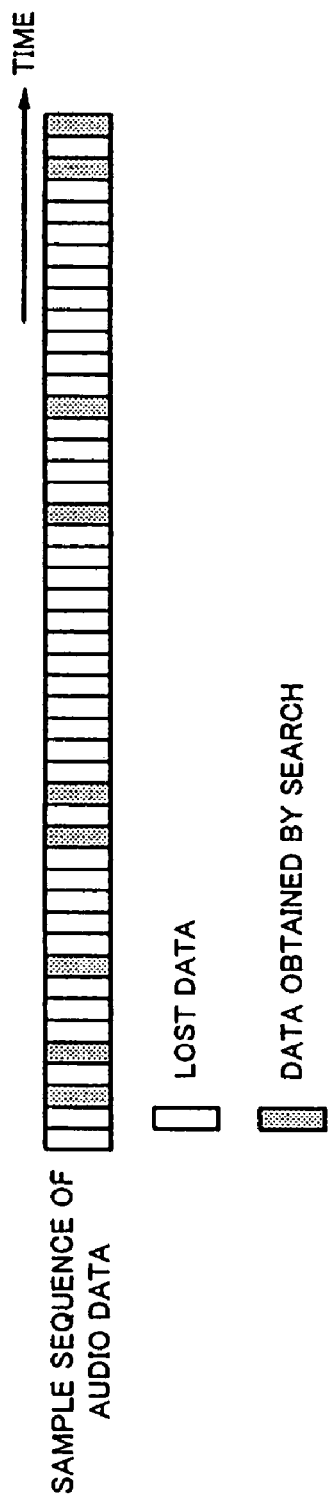
FIG. 2 is a schematic diagram showing audio data obtained by the VCR in its variable speed reproducing operation.

Next, with reference to FIG. 2, audio data that can be obtained in the variable speed reproducing mode will be described. When data are searched, intermittent samples rather than all data are obtained. When data are searched, audio data are generated with intermittently obtained data. Thus, when data are searched, it is difficult to clearly hear audio data. Moreover, a reproducing apparatus cannot output a listenable audio sound when searching data from a disc-shaped recording medium such as a compact disc (CD).

Next, with reference to the accompanying drawings, embodiments of the present invention will be described. According to the present invention, video data and audio data that are broadcast and edited are recorded on a disc-shaped recording medium. In addition, sub video data, sub audio data, and meta data are recorded on the same disc. In the following description, video data and audio data that are broadcast and edited are referred to as main audio/video (AV) data. On the other hand, sub video data and sub audio data are referred to as sub AV data. Video data and audio data of sub AV data are referred to as sub video data and sub audio data, respectively.

Video data of main AV data are base-band video data that are compression-encoded in accordance with the moving picture experts group 2 (MPEG2) system at a bit rate of 50 Mega bits per second (Mbps) and/or 25 Mbps. On the other hand, audio data of main AV data are data that are sampled at 48 kHz and quantized with 24 bits and/or 16 bits. According to the present invention, video data and audio data of main AV data that have been encoded in accordance with these different systems are recorded on the same disc.

On the other hand, sub AV data are audio/video data whose bit rate is lower than main AV data. When main AV data are recorded onto the disc, sub AV data are generated with the main AV data. The sub video data are compression-encoded in accordance with for example the MPEG4 system. In addition, as will be described later, the sub audio data are compression-encoded in accordance with for example A-Law system and sample thin-out process. Thus, the bit rate of the sub AV data is decreased to for example several Mbps against the main AV data.

Video data can be compression-encoded with both an intraframe compression code in accordance with the discrete cosine transform (DCT) system and an interframe compression code in accordance with the chronological predictive encoding system. In the MPEG system, a bidirectional (B) picture and a predictive (P) picture that are chronologically and predictively encoded are defined. In addition, an intra (I) picture that is composed with one screen (one frame) is defined. A group-of-picture (GOP) is a group that contains at least one I picture and that is self completed. A GOP is a minimum accessible unit of an MPEG stream.

Meta data are high level data. Meta data functions as an index that represents the contents of various types of data. Meta data are categorized as chronological meta data and non-chronological meta data. The chronological meta data are chronologically generated in accordance with main AV data. The non-chronological meta data are generated in predetermined regions such as scenes of main AV data.

Next, a data arrangement on a disc-shaped recording medium according to the present invention will be described. Data are recorded as if growth rings, or annulus, were formed on a disc. Hereinafter, such data are referred to as simply ring data. The ring data are recorded on a disc in the unit of a data amount represented by reproduction duration of data. Assuming that data recorded on a disc is only audio data and video data of main AV data, the audio data and the video data in a reproduction time zone are alternately placed every predetermined reproduction duration equivalent to a data size of one track or more. When audio data and video data are recorded in such a manner, sets of them are time-sequentially layered as growth rings.

In addition to audio data and video data in a reproduction time zone, sub AV data and chronological meta data in the reproduction time zone are recorded as a set. As a result, a growth ring is formed on an optical disc 1.

Data that composes a growth ring is referred to as growth ring data. Growth ring data have a data amount that is an integer multiple of a data amount of a sector that is the minimum recording unit of the disc. In addition, growth ring data are recorded so that the boundary thereof matches the boundary of a sector of the disc.

Figure 3:
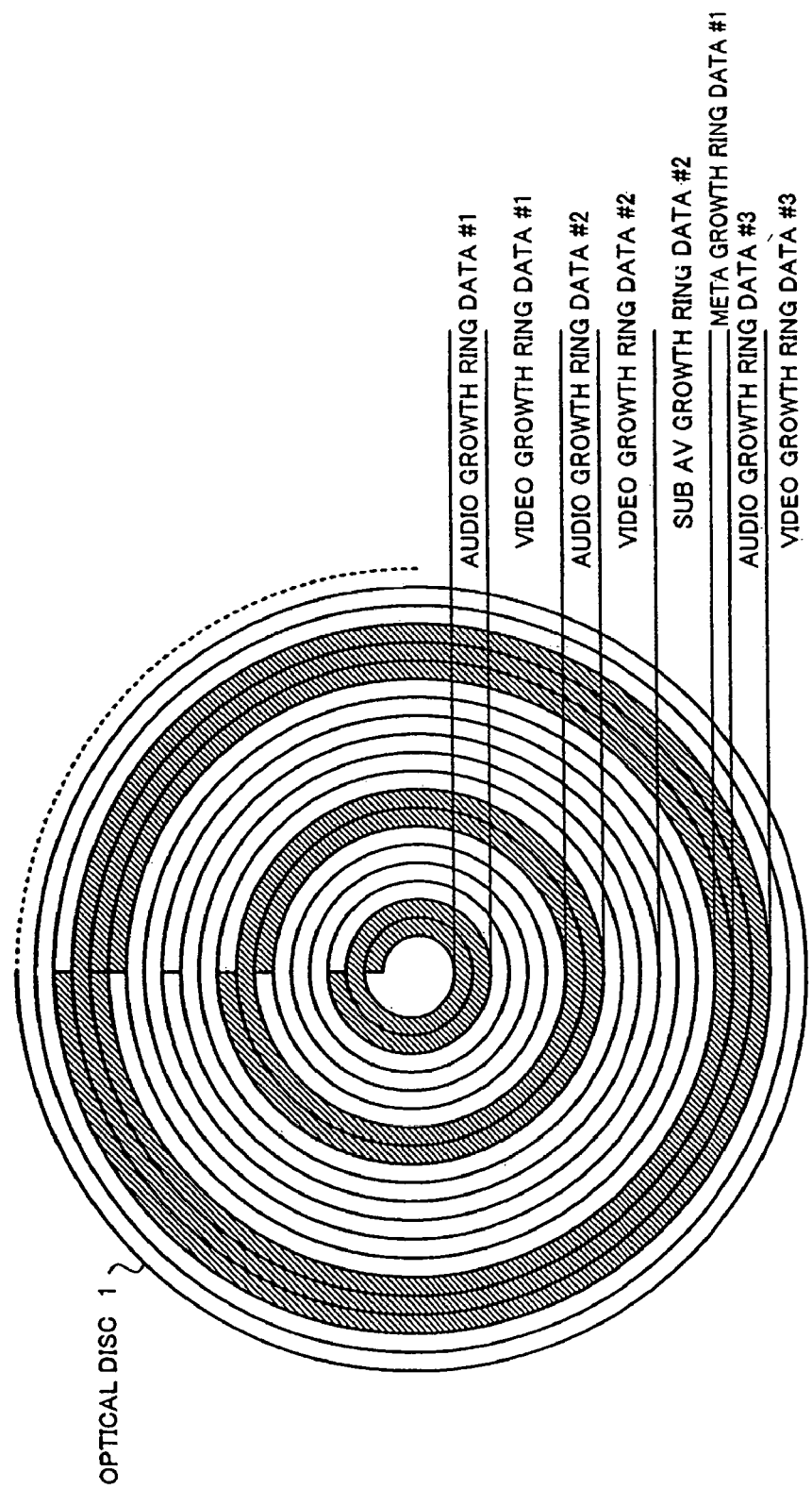
FIG. 3 is a schematic diagram showing an example of growth ring data formed on an optical disc.

FIG. 3 shows an example of which growth ring data are formed on the optical disc 1. In the example shown in FIG. 3, audio growth ring data #1, video growth ring data #1, audio growth ring data #2, video growth ring data #2, sub AV growth ring data #1, and chronological meta growth ring data #1 are recorded from the inner periphery side of the optical disc 1. In such a cycle, growth ring data are treated. On the outer periphery of the chronological meta growth ring data #1, part of growth ring data of the next cycle is formed as audio growth ring data #3 and video growth ring data #3.

In the example shown in FIG. 3, a reproduction time zone of data of one growth ring of chronological meta growth ring data corresponds to that of sub AV growth ring data. A reproduction time zone of data of one growth ring of chronological meta growth ring data corresponds to that of data of two growth rings of audio growth ring data. Likewise, a reproduction time zone of data of one growth ring of chronological metal growth ring data corresponds to that of two growth rings of video data. The relation between a reproduction time zone and the number of cycles of each type of growth ring data depends on for example the data rate thereof. It is preferred that the reproduction duration of data of one growth ring of video growth ring data and audio growth ring data should be experimentally around 1.5 to 2 seconds.

Figure 4A:
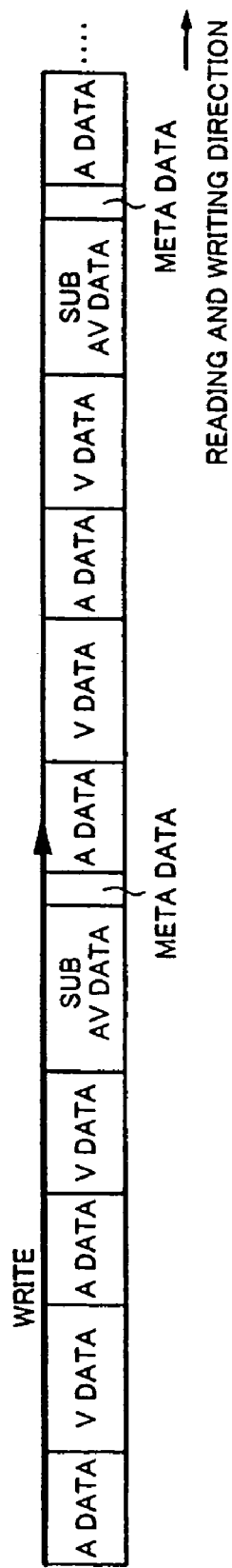
FIG. 4A and FIG. 4B are schematic diagrams showing examples of which data are read from and written to an optical disc on which anural rings have been formed.
Figure 4B:
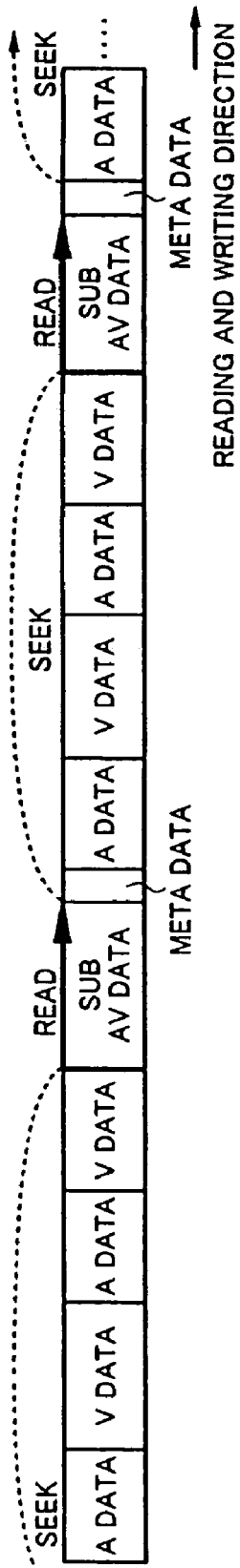

FIG. 4A and FIG. 4B show examples of data being read from and written to the optical disc 1 on which growth rings are formed as shown in FIG. 3. When the optical disc 1 has a sufficient successive error-free blank area, as shown in FIG. 4A, audio growth ring data, video growth ring data, sub AV growth ring data, and chronological meta growth ring data generated from data sequences of audio data, video data, and sub AV data chronological meta data in accordance with a reproduction time zone are written to the blank area of the optical disc 1 as if they were written in a single stroke. At that point, each type of data are written so that the boundary thereof matches the boundary of a sector of the optical disc 1. Data of the optical disc 1 are read in the same manner as they are written thereto.

On the other hand, when a predetermined data sequence is read from the optical disc 1, an operation for seeking the record position of the data sequence and reading the data is repeated. FIG. 4B shows an operation for selectively reading a sequence of sub AV data in such a manner. For example, with reference to FIG. 3, after the sub AV growth ring data #1 are read, the chronological meta growth ring data #1, the audio growth ring data #3, the vide growth ring data #3, the audio growth ring data #4, and video growth ring data #4 (not shown) are sought and skipped. Thereafter, sub AV growth ring data #2 of the next cycle are read.

In such a manner, since data are recorded on the optical disc 1 cyclically as growth ring data in accordance with a reproduction time zone in the unit of a predetermined reproduction duration, audio growth ring data and video growth ring data in the same reproduction time zone are placed at close positions on the optical disc 1. Thus, audio data and video data in the same reproduction time zone can be quickly read and reproduced from the optical disc 1. In addition, since audio data and video data are recorded so that the boundaries of growth rings match the boundaries of sectors, only audio data or video data can be read from the optical disc 1. As a result, only audio data or video data can be quickly edited.

In addition, as described above, the data amount of each of audio growth ring data, video growth ring data, sub AV growth ring data, and chronological meta growth ring data is an integer multiple of the data amount of a sector of the optical disc 1. Moreover, growth ring data are recorded so that the boundaries thereof match the boundaries of sectors. Thus, when only one of sequences of audio growth ring data, video growth ring data, sub AV growth ring data, and chronological meta growth ring data is required, only required data can be read without need to read other data.

To effectively use the advantage of the data arrangement of growth rings of the optical disc 1, data should be recorded so that the succession of growth rings is secured. Next, an operation for securing the succession of growth rings will be described with reference to FIG. 5A, FIG. 5B, and FIG. 5C. Now, it is assumed that only sub AV growth ring data (denoted by LR in FIG. 5) is read.

Figure 5A:
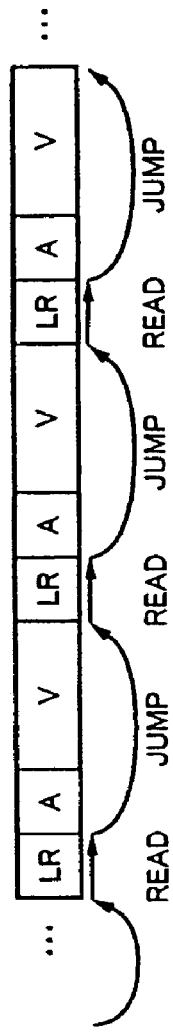
FIG. 5A, FIG. 5B, and FIG. 5C are schematic diagrams showing that data are recorded on the disc so the succession of growth rings is secured.

When data are recorded, if a large blank area is secured on the optical disc 1, a plurality of growth rings can be successively recorded. In this case, as shown in FIG. 5A, chronologically successive sub AV growth ring data can be read by a minimum number of track jumps. In other words, an operation of which after sub AV growth ring data are read, the next sub AV growth ring data are read can be repeated. As a result, the distance for which the pickup jumps becomes the minimum.

Figure 5B:
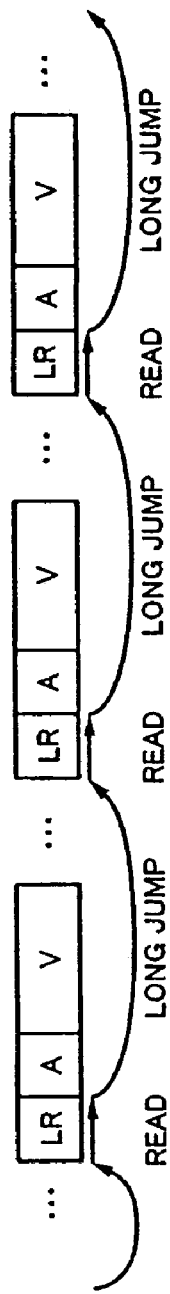
Figure 5C:
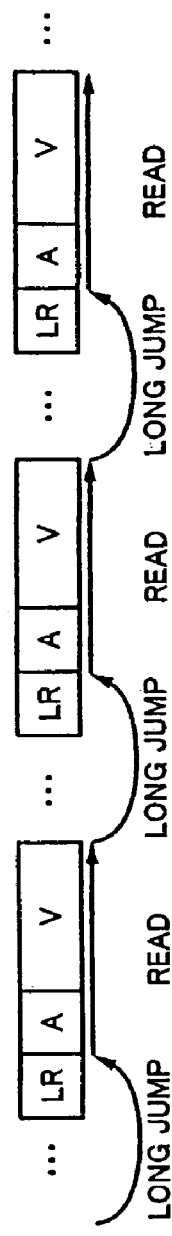

In contrast, when data are recorded, if a successive blank area cannot be secured and chronologically successive sub AV data are recorded in separate areas on the optical disc 1, as shown in FIG. 5B, after reading the first sub AV growth ring data, the pickup should jump for a distance of a plurality of growth rings so as to read the next sub AV growth ring data. Since this operation is repeated, the read speed for sub AV growth ring data is decreased from that shown in FIG. 5A. In addition, the reproduction of non-edited AV data (AV clips) may be delayed as shown in FIG. 5C.

Thus, according to the present invention, an allocation unit having a length of a plurality of growth rings is defined so as to secure the succession of growth rings. When data are recorded as growth rings, a successive blank area that exceeds an allocation unit length defined by the allocation unit is secured.

Figure 6A:
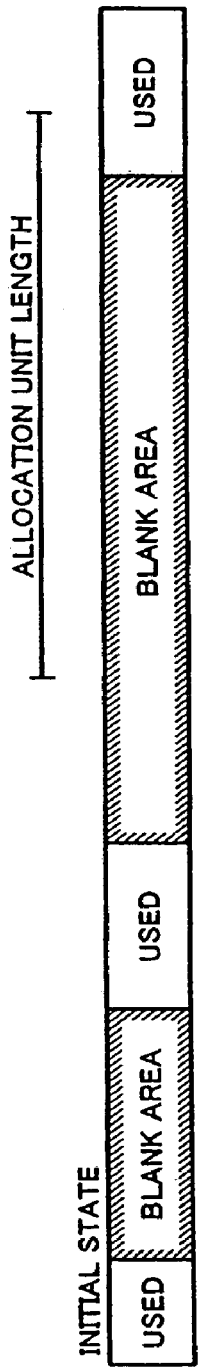
FIG. 6A, FIG. 6B, FIG. 6C, and FIG. 6D are schematic diagrams showing allocation units.

Next, with reference to FIG. 6A, FIG. 6B, FIG. 6C, and FIG. 6D, an operation for securing a successive blank area will be practically described. The allocation unit length is pre-designated. The allocation unit length is designated to a multiple of a total reproduction duration of individual types of data in one growth ring. Assuming that the reproduction duration of one growth ring is 2 seconds, the allocation unit length is designated to 10 seconds. The allocation unit length is used as a rule for measuring the length of a blank area of the optical disc 1 (see an upper right portion of FIG. 6A). As shown in FIG. 6A, it is assumed that there are three used areas that are separate areas on the optical disc 1 and that areas surrounded by the used areas are blank areas.

Figure 6B:
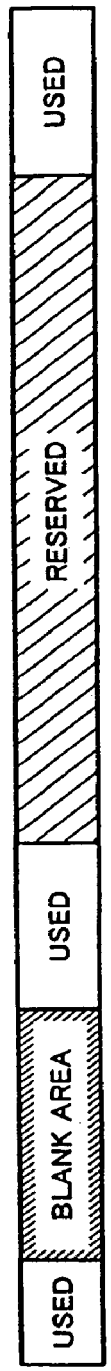
Figure 6C:
Figure 6D:

When AV data having a predetermined length and sub AV data corresponding thereto are recorded onto the optical disc 1, the allocation unit length is compared with the lengths of blank areas and a blank area having a length equal to or larger than the allocation unit length is secured as a reserved area (see FIG. 6B). In the example shown in FIG. 6A, it is assumed that the right side blank area of the two blank areas is longer than the allocation unit length and secured as a reserved area. Thereafter, growth ring data are successively recorded to the reserved area from the beginning (see FIG. 6C). When the growth ring data are recorded and the length of the blank area of the reserved area is smaller than the length of one growth ring that is recorded next (FIG. 6D), the reserved area is unallocated. As shown in FIG. 6A, another bank area that is equal to or larger than the allocation unit length is searched for a reserved area.

Since a blank area for a plurality of growth rings is sought and the growth rings are recorded in the sought blank area, the succession of the growth rings is secured to some extent. As a result, growth ring data can be smoothly reproduced. In the foregoing example, it was assumed that the allocation unit length is designated to 10 seconds. However, the present invention is not limited to such an example. Instead, a longer period can be designated as the allocation unit length. It is preferred that the allocation unit length should be designated in the range from 10 to 30 seconds.

Figure 7:
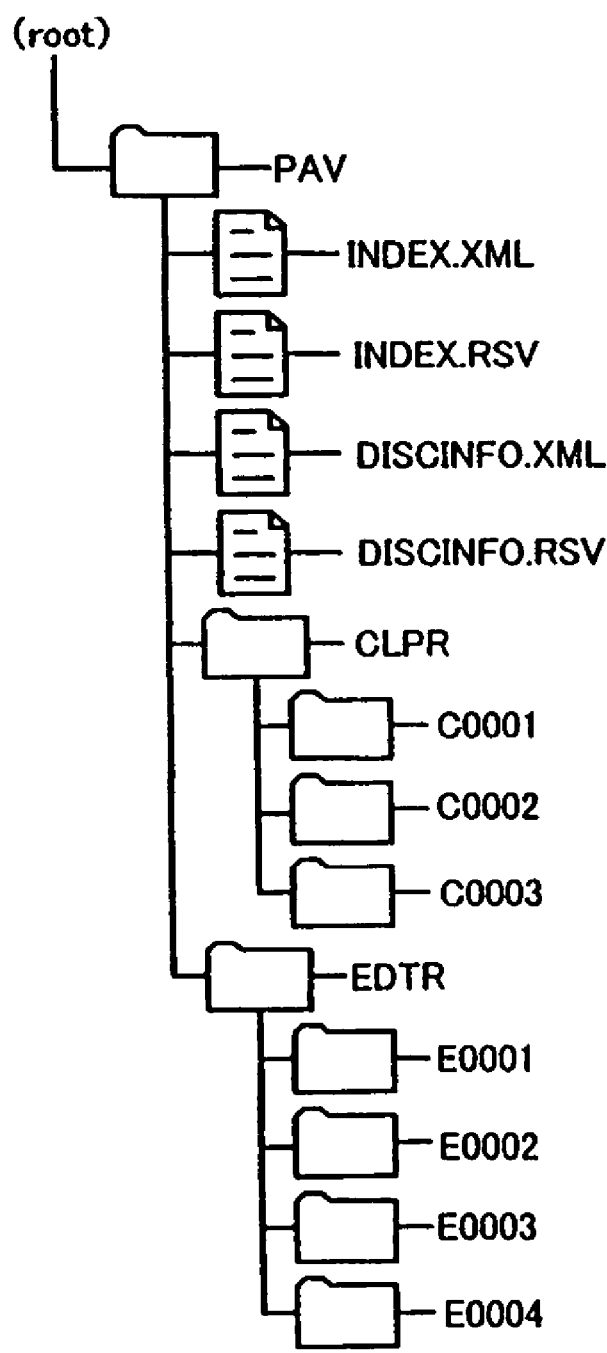
FIG. 7 is a schematic diagram showing a management structure of data.

Next, with reference to FIG. 7, FIG. 8, and FIG. 9, a data management structure according to the present invention will be described. According to this embodiment of the present invention, data are managed in a directory structure. In the directory structure, for example, the universal disk format (UDF) is used as a file system. As shown in FIG. 7, immediately below a root directory, a directory PAV is placed. According to this embodiment, sub directories of the directory PAV will be defined.

Audio data and video data of a plurality of types of signals recorded on one disc are defined below the directory PAV. Data may be or may not be recorded in the directory PAV that is not managed according to the embodiment of the present invention.

Immediately below the directory PAV, four files (INDEX.XML, INDEX.RSV, DISCINFO.XML, and DISCINFO.RSV) are placed. In addition, two directories (CLPR and EDTR) are placed.

The directory CLPR serves to manage clip data. In this example, a clip is a block of data recorded after a photography is started until it is stopped. For example, in an operation of a video camera, data recorded after an operation start button is pressed until an operation stop button is pressed (the operation start button is released) is one clip.

In this example, a block of data is composed of the foregoing main audio data and main video data, sub AV data generated with the main audio data and main video data, chronological meta data corresponding to the main audio data and main video data, and non-chronological meta data. Directories "C0001" "C0002," and so forth immediately below the directory CLPR each store a block of data that composes a clip.

Figure 8:
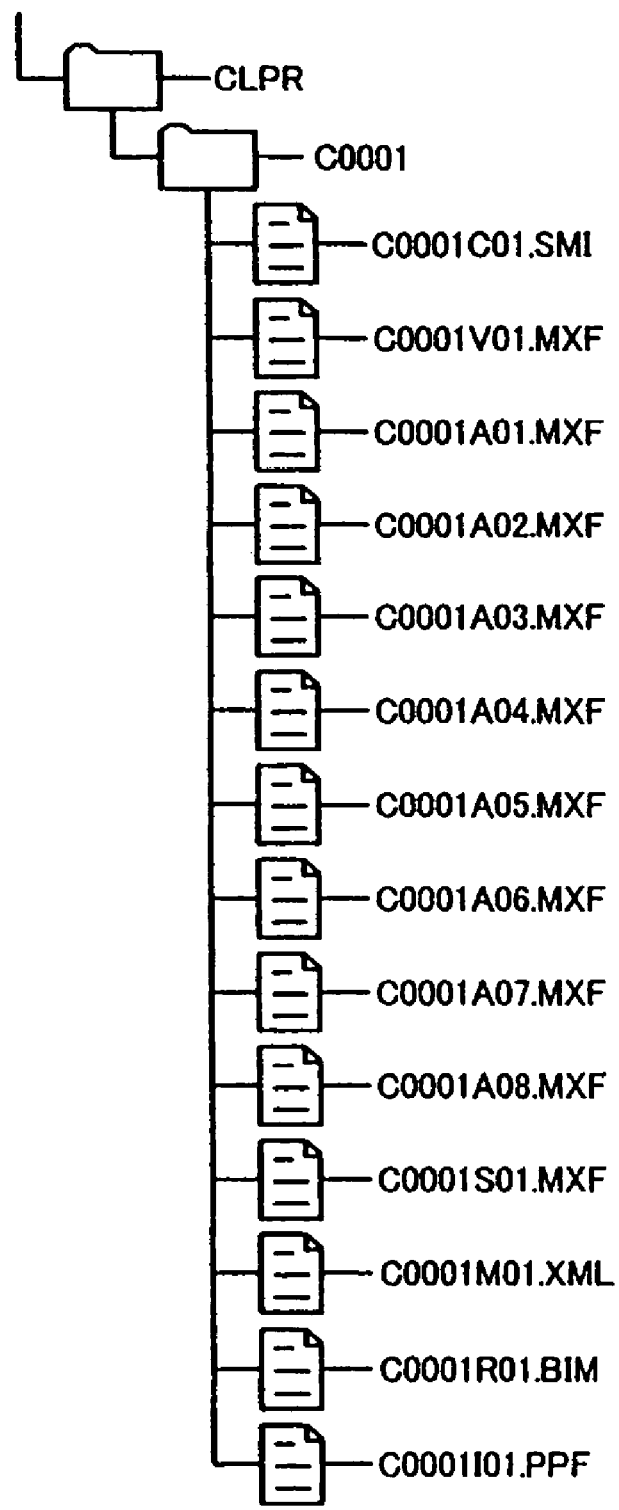
FIG. 8 is a schematic diagram showing a management structure of data.

FIG. 8 shows an example of the structure of the directory "C0001" for one clip "C0001" placed immediately below the directory CLPR. Hereinafter, a directory for one clip placed immediately below the directory CLPR is referred to as clip directory. Each member of data that compose a block of data is identified by a file name and placed in the clip directory "C0001." In the example shown in FIG. 8, a file name is composed of 12 digits including a delimiter ".". The first five digits of eight digits followed by the delimiter "." are used to identify a clip. The three digits immediately followed by the delimiter "." are used to identify data type such as audio data, video data, and sub AV data. The three digits immediately preceded by the delimiter "." are an extension that represents a data format.

In the example shown in FIG. 8, as a block of files that compose the clip "C0001," a file "C0001C01.SMI" for clip information, a main video data file "C0001V01.MXF," main audio data files of eight channels "C0001A01.MXF" to "C0001A08.MXF," a sub AV data file "C0001S01.MXF," a non-chronological meta data file "C0001M01.XML," a chronological meta data file "C0001R01.BIM," and a pointer information file "C0001I01.PPF" are placed in the clip directory "C0001."

According to the present invention, the foregoing types of data signals can be placed in clip directories of the directory CLPR. For example, as signal types of main video data, video data of single GOP and 50 Mbps can be placed in the clip directory "C0001" and video data of long GOP and 25 Mpbs can be placed in the clip directory "C0002." On the other hand, a plurality of types of data signals cannot be placed in one clip directory. For example, a video data file of which one portion has been recorded at a bit rate of 50 Mbps and the rest has been recorded at a bit rate of 25 Mbps cannot be placed in a clip directory.

In all frames, a single GOP is composed of only an I picture and has a structure of 1 GOP=1 frame. A single frame can be edited in high quality. A long GOP is composed of a plurality of frames that are I pictures, P pictures, and B pictures. One long GOP is completed with an I picture. A long GOP may be composed without a B picture.

Returning to FIG. 7, the directory EDTR serves to manage edit information. According to the present invention, an edit result is recorded as an edit list and a play list. Blocks of data each of which composes an edit result are placed in directories "E0001," "E0002," and so forth placed immediately below the directory EDTR.

An edit list describes edit points (IN points, OUT points, and so forth) of clips, a reproduction order thereof, and so forth. An edit list is composed of nondestructively edit results of clips and a play list that will be described later. When a nondestructively edit result of an edit list is reproduced, files placed in a clip directory are referenced in accordance with the description of the list and a picture is successively reproduced from a plurality of clips as if one edited stream were reproduced. However, for a nondestructively edit result, files are referenced from the list regardless of the positions of the files on the optical disc 1. Thus, the succession of reproduced data is not secured.

When an edit result represents that files or a part thereof cannot be successively reproduced, a play list causes the files or part thereof to be reallocated in a predetermined area of the optical disc 1 so as to secure the succession of reproduced data according to an edit list.

In accordance with an edit list created by an editing operation, management information for files that are used for the editing operation (for example, an index file "INDEX.XML" that will be described later) is referenced. With reference to the management information, it is determined whether or not files that are referenced can nondestructively, namely successively, be reproduced in the state that the files that are referenced in accordance with the edit result are placed in respective clip directories. When the determined result represents that the files cannot be successively reproduced, relevant files are copied to a predetermined area of the optical disc 1. These files copied to the predetermined area are referred to as bridge essence files. A list of which bridge essence files are reflected to an edit result is referred to as play list.

For example, when clips are reproduced in accordance with an edit result that complicatedly references the clips, the pickup may not be able to seek a clip to be reproduced next in time. In such a case, a play list is created. Bridge essence files are recorded in the predetermined area of the optical disc 1.

Figure 9:
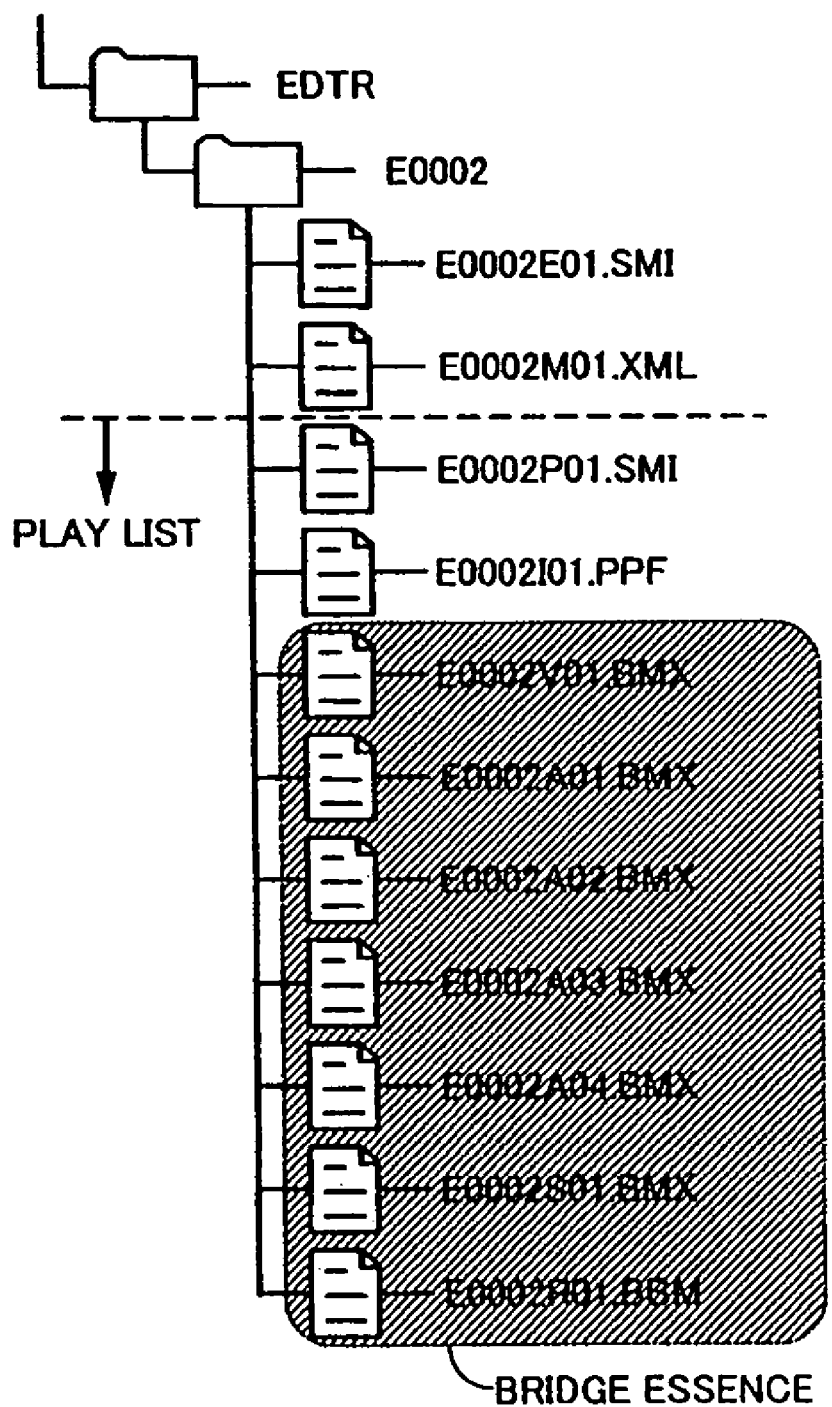
FIG. 9 is a schematic diagram showing a management structure of data.

FIG. 9 shows an example of the structure of the directory "E0002" corresponding to an edit result "E0002." The directory "E0002" is placed immediately below the directory EDTR. Hereinafter, a directory corresponding to one edit result and placed immediately below the directory EDTR is referred to as edit directory. Data generated as an edit result in the foregoing manner are identified by a file name and placed in the edit directory "E0002." As described above, a file name is composed of 12 digits. The first five digits of eight digits followed by the delimiter "." are used to identify an editing operation. The tree digits immediately followed by the delimiter are used to identify a data type. The three digits preceded by the delimiter "." are an extension that identifies a data format.

In reality, in the example shown in FIG. 9, as files that compose the edit result "E0002," an edit list file "E0002E01.SM1," a file "E0002M01.XML" for information of chronological and non-chronological meta data, a play list file "E0002P01.SMI," bridge essence files for main data "E0002V01.BMX" and "E0002A01.BMX" to "E0002A04.BMX," a bridge essence file for sub AV data "E0002S01.BMX," and a bridge essence file for chronological and non-chronological meta data "E0002R01.BMX" are placed in the edit directory "E0002."

In FIG. 9, shaded files placed in the edit directory "E0002," namely the bridge essence files for main data "E000V01.BMX" and "E0002A01.BMX" to "E0002A04.BMX," the bridge essence file for sub AV data "E0002S01.BMX" and the bridge essence file for chronological and non-chronological meta data "E0002R01.BMX" are files contained in the play list.

As described above, an edit list references for example video data placed in a clip directory. Since different types of data signals can be placed in clip directories, an edit list can contain different types of data signals.

Returning to FIG. 7, the file "INDEX.XML" is an index file that serves to manage material information placed in the directory PAV or its sub directories. In this example, the file "INDEX.XML" is described in the extensible markup language (XML) format. The file "INDEX.XML" serves to manage the foregoing clips and edit list. For example, with the file "INDEX.XML," a conversion table of file names and UMIDs, duration information, a reproduction order of materials reproduced from the optical disc 1, and so forth are managed. In addition, with the file "INDEX.XML," video data, audio data, sub AV data, and so forth of each clip are managed. Moreover, with the file "INDEX.XML," clip information managed with files in a clip directory is managed.

The file "DISCINFO.XML" serves to manage information of the disc. Reproduction position information and so forth are also placed in the file "DISCINFO.XML."

Figure 10:
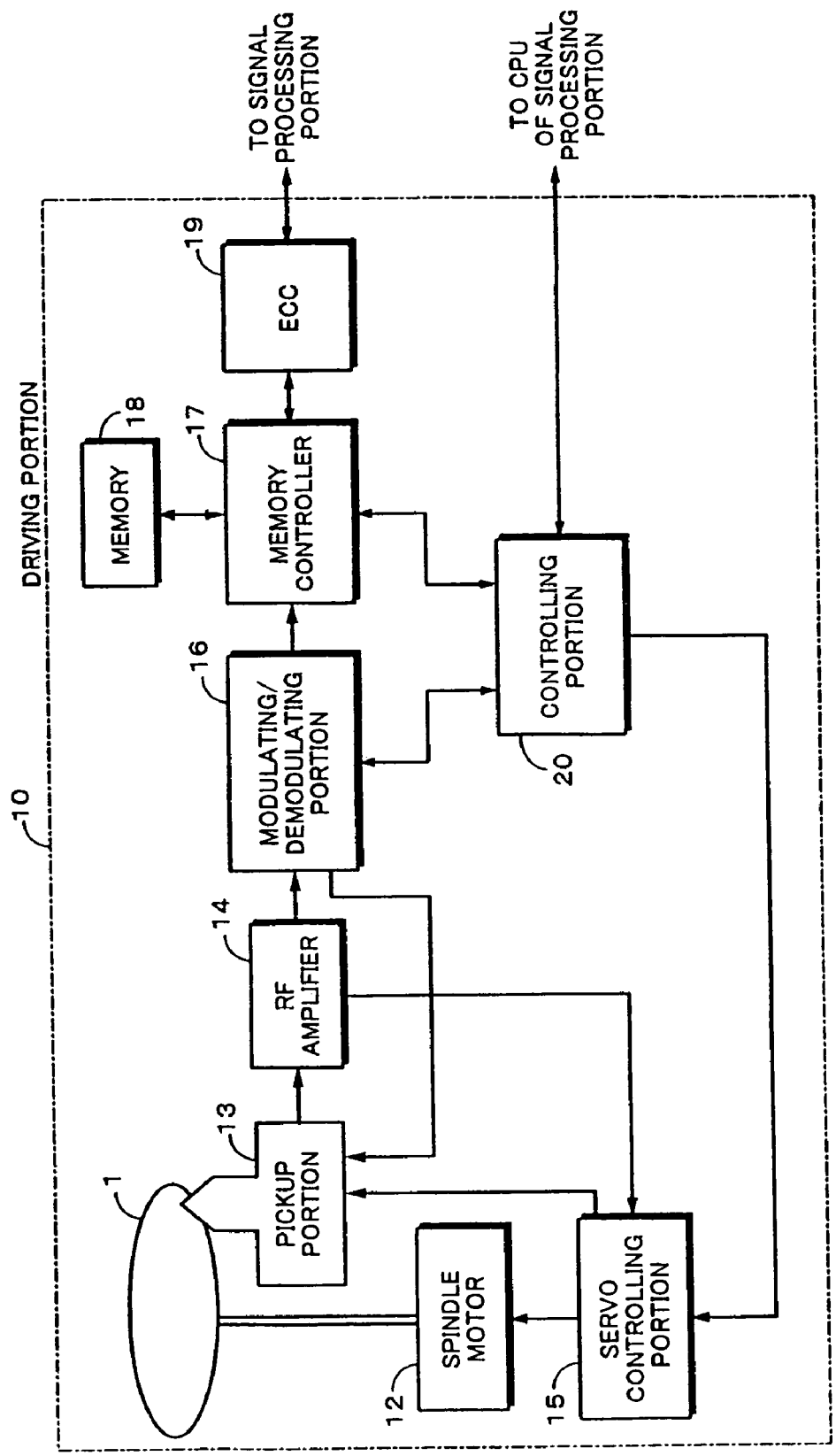
FIG. 10 is a block diagram showing an example of the structure of a driving portion of a recording and reproducing apparatus according to an embodiment of the present invention.

Next, a recording and reproducing apparatus according to the present invention will be described. FIG. 10 shows an example of the structure of a driving portion 10 of the recording and reproducing apparatus.

When data are recorded onto the optical disc 1, record data are supplied from a signal processing portion 41 (that will be described later) (see FIG. 11). The record data are stored in a memory 18 through an error correction coding (ECC) portion 19 and a memory controller 17. The memory controller 17 accesses the memory 18 under the control of a controlling portion 20. The controlling portion 20 is composed of a microcomputer. The controlling portion 20 controls the driving portion 10 in accordance with a control signal received from the signal processing portion 41.

The ECC portion 19 generates an error correction code for each error correction unit of the record data stored in the memory 18. As an error correction code for video data and audio data, a product code can be used. With a product code, data symbols are dually encoded. In other words, a two dimensional array of video data or audio data is encoded with an outer code in the vertical direction and with an inner code in the horizontal direction. As an outer code and an inner code, Reed-Solomon code can be used. A data unit that is completed with a product code is referred to as ECC block. The size of an ECC block is for example 64 kbytes (65536 bytes). The memory controller 17 reads an ECC block from the memory 18 and supplies the ECC block as record data to a modulating/demodulating portion 16. The modulating/demodulating portion 16 modulates the record data, generates a record signal, and supplies the generated record signal to a pickup portion 13.

The pickup portion 13 controls the output of laser light in accordance with the record signal supplied from the modulating/demodulating portion 16 and records the record signal onto the optical disc 1 that is rotated by a spindle motor 12.

The pickup portion 13 converts reflected light of the optical disc 1 into a current signal and supplies the current signal to an radio frequency (RF) amplifier 14. The RF amplifier 14 generates a focus error signal, a tracking error signal, and a reproduction signal in accordance with the current signal supplied from the pickup portion 13. The tracking error signal and the focus error signal are supplied to a servo controlling portion 15. When data are reproduced from the optical disc 1, the RF amplifier 14 supplies the reproduction signal to the modulating/demodulating portion 16.

The radiation position of the laser light is controlled in accordance with a servo signal supplied from the servo controlling portion 15 to the pickup portion 13. In other words, the servo controlling portion 15 controls a focus servo operation and a tracking servo operation. The servo controlling portion 15 generates a focus servo signal and a tracking servo signal in accordance with the focus error signal and tracking error signal supplied from the RF amplifier 14 and supplies the generated signals to an actuator (not shown) of the pickup portion 13. The servo controlling portion 15 generates a spindle motor drive signal that causes the spindle motor 12 to be driven. The servo controlling portion 15 controls a spindle servo operation for rotating the optical disc 1 at a predetermined velocity.

The servo controlling portion 15 performs a thread controlling operation for moving the pickup portion 13 in the radius direction of the optical disc 1 and changing the radiation position of the laser light. The controlling portion 20 sets the signal read position of the optical disc 1 in accordance with a control signal supplied from the signal processing portion 41. The controlling portion 20 controls the position of the pickup portion 13 so that it can read the signal from the read position.

The spindle motor 12 rotates the optical disc 1 at constant linear velocity (CLV) or constant angular velocity (CAV) in accordance with a spindle motor drive signal received from the servo controlling portion 15. The driving system of the spindle motor 12 is switched between CLV and CAV in accordance with a control signal received from the signal processing portion 41.

When data are reproduced from the optical disc 1, the pickup portion 13 focuses laser light on the optical disc 1 and supplies a current signal into which reflected light of the optical disc 1 has been converted to the RF amplifier 14. The modulating/demodulating portion 16 demodulates a reproduction signal supplied from the RF amplifier 14, generates reproduction data, and supplies the generated reproduction data to the memory controller 17. The memory controller 17 writes the supplied reproduction data to the memory 18. The reproduction data are read as ECC blocks from the memory 18 and supplied to the ECC portion 19. The ECC portion 19 decodes an error correction code of each ECC block of the reproduction data and corrects an error of the reproduction data. The error-corrected reproduction data are supplied to the signal processing portion 41.

Figure 11:
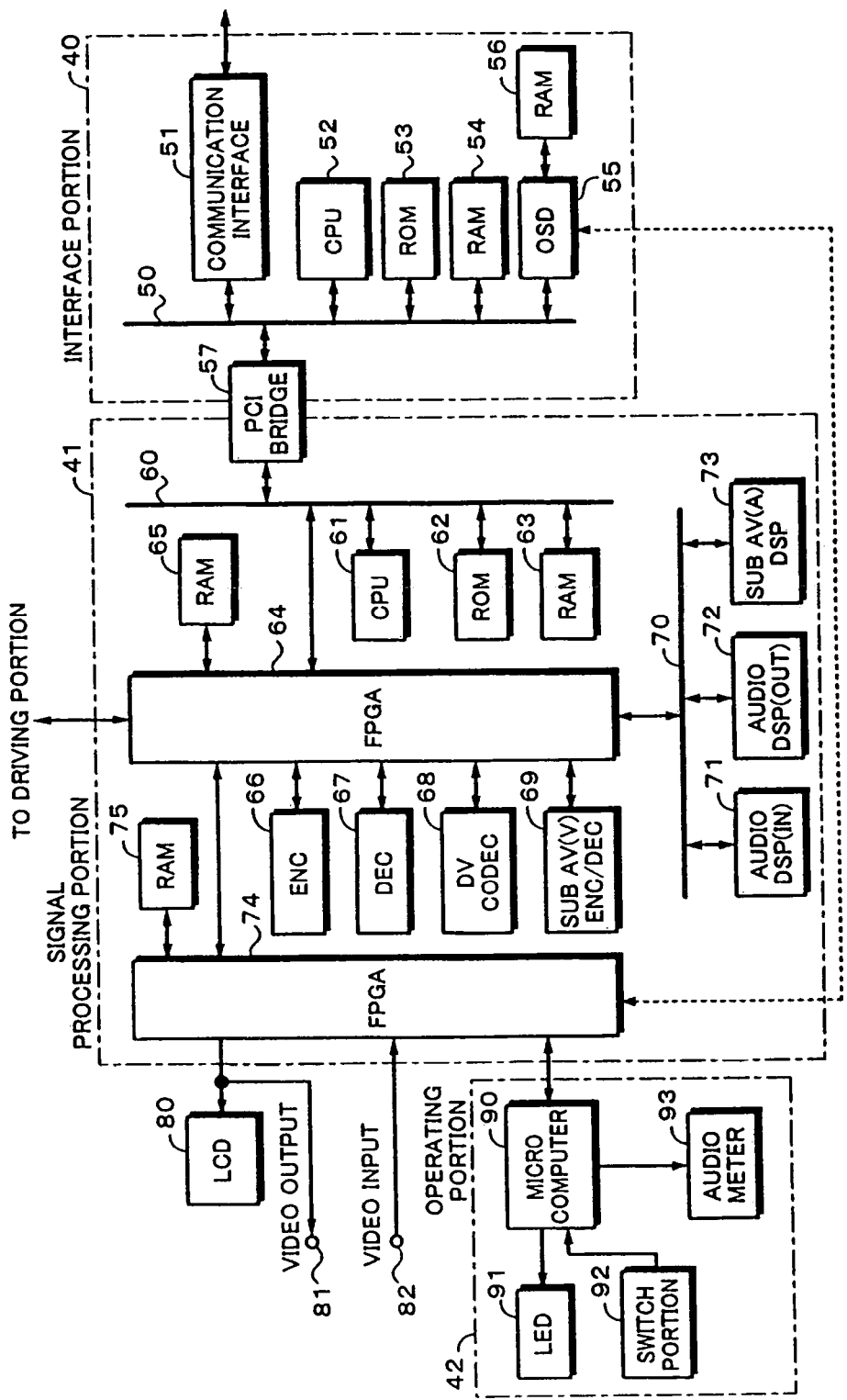
FIG. 11 is a block diagram showing an example of the overall structure of the recording and reproducing apparatus according to the present invention.

FIG. 11 shows an example of the overall structure of the recording and reproducing apparatus according to the present invention. The driving portion 10 (not shown), an interface portion 40, and an operating portion 42 are connected to the signal processing portion 41. A displaying portion 80 is connected to the signal processing portion 41. The displaying portion 80 is composed of for example a liquid crystal display (LCD). A picture reproduced from the optical disc 1, a picture that is input to the recording and reproducing apparatus, a user interface, and so forth are displayed by the displaying portion 80.

In the signal processing portion 41, the driving portion 10 is connected to a field programmable gate array (FPGA) 64. Record data and reproduction data are exchanged between the driving portion 10 and the signal processing portion 41. In addition, a control signal is exchanged between the signal processing portion 41 and the controlling portion 20 of the driving portion 10 through the FPGA 64.

A RAM 65, an encoder 66, a decoder 67, a DV codec 68, and a sub AV data encoder/decoder 69 are connected to the FPGA 64. The sub AV data encoder/decoder 69 encodes sub video data. A bus 70 is connected to the FPGA 64. An input data audio digital signal processor (DSP) 71, an output data audio DSP 72, and a sub AV data audio DSP 73 are connected to the bus 70. In addition, a bus 60 and an FPGA 74 are connected to the FPGA 64. The FPGA 64 functions as a memory controller for the RAM 65. In addition, the FPGA 64 controls a data flow among individual portions that are connected in the FPGA 64.

A RAM 75 is connected to the FPGA 74. The displaying portion 80, an output terminal 81, and an input terminal 82 are connected to the FPGA 74. A microcomputer 90 of the operating portion 42 is connected to the FPGA 74. The displaying portion 80 has a displaying device and a driving portion. The displaying device is composed of a liquid crystal device (LCD). The driving portion drives the displaying device. Like the foregoing FPGA 64, the FPGA 74 functions as a memory controller for the RAM 75. In addition, the FPGA 74 controls a data flow among individual portions that are connected in the signal processing portion 41.

The bus 60 is for example a peripheral component bus (PCI). A central processing unit (CPU) 61, a read-only memory (ROM) 62, and a random access memory (RAM) 63 are connected to the bus 60. The RAM 63 is used as a work memory for the CPU 61. In reality, the ROM 62 is composed of two rewritable flash memories. One flash memory is used to store a system startup program and the other flash memory is used to pre-store a program and data that are used after the program is started up. The RAM 63 and the other flash memory of the ROM 62 are connected to the CPU 61 through a CPU bus (not shown).

The CPU 61 controls the signal processing portion 41 in accordance with the program stored in the other flash memory of the ROM 62. In addition, the CPU 61 controls the driving portion 10 to access the optical disc 1. In addition, the CPU 61 accesses the memory 18. Moreover, the CPU 61 manages the directory structure of the optical disc 1 described in FIG. 7 to FIG. 9.

In the interface portion 40, a bus 50 is for example a PCI bus. The bus 50 is connected to the bus 60 through a PCI bridge 57. A communication interface 51, a central processing unit (CPU) 52, a read-only memory (ROM) 53, a random access memory (RAM) 54, and an on-screen display (OSD) portion 55 are connected to the bus 50. The CPU 52, the ROM 53, and the RAM 54 are connected to the bus 50 through a memory controller, a bus controller, and so forth. The RAM 54 is used as a work memory for the CPU 52. The ROM 53 is composed of two rewritable flash memories. One flash memory is used to store a system startup program and the other flash memory is used to store a program and data that are used after the system is started up.

The communication interface 51 controls communication with an external network in accordance with an instruction of the CPU 52. For example, the communication interface 51 can communicate data to the Internet in accordance with the file transfer protocol (FTP). A RAM 56 is connected to the OSD portion 55. The OSD portion 55 generates a picture signal for an user interface in accordance with a display control instruction supplied from the CPU 52.

In the operating portion 42, a switch portion 92 has various types of switches and various types of controllers such as a rotary encoder. The switch portion 92 outputs a signal in accordance with a user's operation against these switches and supplies the control signal to the FPGA 74. The control signal is supplied to the CPU 61 and the CPU 52 in accordance with the type of the control signal. A displaying portion 91 is composed of a plurality of light emitting diodes (LEDs) corresponding to the individual switches of the switch portion 92. The microcomputer 90 controls the LEDs in accordance with the control signal supplied from the switch portion 92. An audio meter 93 is composed of for example a plurality of LEDs. The audio meter 93 displays the level of audio data that are input to the signal processing portion 41 or the level of audio data that are output from the signal processing portion 41 in real time.

A frame synchronous signal corresponding to a frame period of video data is supplied from the outside through an interface (not shown). Alternatively, the frame synchronous signal may be generated in the recording and reproducing apparatus. When necessary, each portion of the recording and reproducing apparatus performs a signal process in synchronization with a frame synchronous signal. The CPU 61 generates a process instruction for main AV data and sub AV data in synchronization with the frame synchronous signal.

In such a structure, when data are recorded onto the optical disc 1, video data and audio data supplied from the outside are input to the input terminal 82. For example, video data and audio data are output from a video camera (not shown) and supplied to the input terminal 82. The video data and audio data are temporarily stored in the RAM 75 and then supplied to the FPGA 64.

The video data and audio data stored in the RAM 65 are supplied to a sub AV data encoder/decoder 69 and a sub AV data audio DSP 73 by the FPGA 64. The sub AV data encoder/decoder 69 and sub AV data audio DSP 73 generate sub AV data.

The sub AV data encoder/decoder 69 compression-encodes the supplied video data in accordance with the MPEG4 system and outputs the encoded data as sub video data. The sub video data that have been compression-encoded by the sub AV data encoder/decoder 69 are written to the RAM 65. The sub AV data encoder/decoder 69 composes one GOP with a total of 10 frames of an I picture of one frame and nine P pictures of nine frames.

The resolution of sub video data of the NTSC system is 352 pixels×240 lines. The resolution of sub video data of the PAL system is 352 pixels×288 lines. When the resolution of the main video data is higher than the resolution of sub video data, the sub AV data encoder/decoder 69 performs a predetermined thin-out process and interpolating process. The color space of sub video data is YCbCr space in which colors are represented by luminance and color difference.

When necessary, the sub AV data audio DSP 73 performs a predetermined signal process such as a level adjusting process for audio data. Thereafter, the audio data are compression-encoded and sub audio data are obtained. As will be described later, for example a thin-out process and an A-Law encoding process are performed for audio data. As a result, the sampling frequency of the audio data is changed from 48 kHz to 8 kHz. In addition, the number of quantizer bits is changed from 16 bits to 8 bits. The sub audio data that have been compression-encoded are written to the RAM 65. Audio data quantized with 24 bits are compression-encoded in such a manner that the low order eight bits of each sample are deleted so that one sample is composed of 16 bits.

While the sub AV data encoder/decoder 69 and the sub AV data audio DSP 73 are encoding sub video data and sub audio data, main AV data are encoded. As described above, the recording and reproducing apparatus according to the embodiment has two process modes for main video data that are a mode for a data rate of 50 Mbps and a mode for a data rate of 25 Mbps.

In the mode for a data rate of 50 Mbps, video data that are read form the RAM 65 are supplied to the encoder 66. The encoder 66 compression-encodes the video data in accordance with the MPEG2 system. At that point, the encoder/decoder 69 encodes video data as all I pictures rather than performing an inter-frame compression in consideration of an editing operation for each frame. In addition, the encoder/decoder 69 properly selects quantizer coefficients in each frame or in each macro block of which each frame is divided so that the data rate of encoded data becomes 50 Mbps. Video data encoded by the encoder 66 is temporarily stored in the RAM 65.

In the mode for a data rate of 25 Mbps, video data that are read from the RAM 65 are supplied to the DV codec portion 68. The DV codec portion 68 performs a compression-encoding process for supplied video data in accordance with for example the DV format. The video data encoded in the DV codec portion 68 are temporarily stored in the RAM 65.

Main audio data of main AV data are read from the RAM 65 by the FPGA 64 and supplied to the audio DSP 71. Main audio data encoded by the audio DSP 71 are stored in the RAM 65.

Main audio data and main video data stored in the RAM 65 for a predetermined reproduction duration corresponding to a growth ring are mapped in a recording format and supplied to the driving portion 10 in accordance with an instruction received from the CPU 61. Likewise, sub audio data and sub video data stored in the RAM 65 for a predetermined reproduction duration corresponding to a growth ring are mapped in a format and supplied to the driving portion 10.

Meta data are generated by for example the ROM 62 in a predetermined manner and stored in the RAM 54. Meta data stored in the RAM 65 for a predetermined reproduction duration corresponding to a growth ring are supplied to the driving portion 10 like the main AV data and sub AV data.

The CPU 61 issues an instruction that causes the driving portion 10 to write main AV data, sub AV data, and meta data as growth rings onto the optical disc 1. This instruction is supplied to the controlling portion 20. The controlling portion 20 causes the ECC portion 19 of the driving portion 10 to add an error correction code to main AV data, sub AV data, and meta data in accordance with the instruction received from the CPU 61. The modulating/demodulating portion 16 modulate the main AV data and sub AV data and outputs a record signal. The controlling portion 20 controls write addresses for the record signal and causes the resultant signal to be written onto the optical disc 1.

When data are reproduced from the optical disc 1, the controlling portion 20 of the driving portion 10 controls read addresses for the data in accordance with an instruction received from the CPU 61. The driving portion 10 reads data as growth rings from the optical disc 1. The ECC portion 19 decodes an error correction code for data that have been read from the optical disc 1 and corrects an error of the data. The error-corrected data are output as main AV data, sub AV data, and meta data from the driving portion 10. The main AV data, sub AV data, and meta data are supplied to the FPGA 64 and stored in the RAM 65.

When main video data of main AV data stored in the RAM 65 are data at a data rate of 50 Mbps, the main video data are supplied to the decoder 67. On the other hand, when main video data are data at a data rate of 25 Mbps, the main video data are supplied to the DV codec portion 68. Main video data decoded in the decoder 67 or the DV codec portion 68 are stored in the RAM 65.

The FPGA 64 reads main audio data of main AV data from the RAM 65 and supplies the main audio data to the audio DSP 72. The audio DSP 72 decodes the main audio data and stores the decoded main audio data in the RAM 65.

While main AV data are being decoded, sub AV data are decoded. The FPGA 64 reads sub video data from the RAM 65 that stores sub AV data and supplies the sub video data to the sub AV data encoder/decoder 69. The sub AV data encoder/decoder 69 decodes the sub video data and stores the decoded sub video data to the RAM 65. Likewise, the FPGA 64 reads sub audio data from the RAM 65 and supplies the sub audio data to the sub AV data audio DSP 73. The sub AV data audio DSP 73 decodes the sub audio data so that the number of quantizer bits is returned from eight bits to 16 bits (or 24 bits), samples are interpolated, and the sampling frequency is changed to 48 kHz. The decoded sub audio data are stored in the RAM 65.

The CPU 61 controls timing of main video data, main audio data, sub video data, and sub audio data that have been decoded and stored in the RAM 65 in accordance with a frame synchronous signal (not shown). These data are synchronously read from the RAM 65. The FPGA 64 controls an address pointer of the RAM 65 in accordance with an instruction received from the CPU 61 and reads main audio data and sub audio data from the RAM 65 so that these data synchronize with video data and the main audio data synchronizes with the sub audio data. The main video data, sub video data, main audio data, and sub audio data that are read from the RAM 65 are supplied to the FPGA 74.

The FPGA 74 supplies main video data to the output terminal 81. In addition, the FPGA 74 supplies sub video data to the displaying portion 80. In addition, the FPGA 74 selects main audio data or sub audio data and supplies the selected audio data to the output terminal 81. The main audio data and sub audio data can be selected and output at predetermined timing in accordance with an instruction received from the CPU 61. When audio data are switched between main audio data and sub audio data is selected, it is preferred to perform a cross fading process for the main audio data and sub audio data so as to reduce switching noise.

On the other hand, as described above, the interface portion 40 has the communication interface 51. The communication interface 51 can receive video data and audio data that have been transferred through for example the Internet in accordance with the FTP and transmit the received video data and audio data to the driving portion 10. In other words, the communication interface 51 receives FTP-transferred data, supplies the data to the FPGA 64 through the bus 50, the PCI bridge 57, and the bus 60, and stores the data to the RAM 65. For example, audio data that have been asynchronously transferred in accordance with the FTP are mapped in the RAM 65 so that the audio data are chronologically successive.

The OSD portion 55 of the interface portion 40 generates picture data for a graphical user interface (GUI) screen with the RAM 56 in accordance with a display control instruction received from the CPU 52. The generated picture data are read from the RAM 56 and transferred to the FPGA 74. The FPGA 74 supplies the picture data to the displaying portion 80. The displaying portion 80 displays for example the GUI screen.

FIG. 12A, FIG. 12B, FIG. 12C, FIG. 12D, FIG. 12E, and FIG. 12F show an example of the format of sub AV data. As shown in FIG. 12A, sub AV data are composed of a header portion and a plurality of edit units. A system portion placed at the beginning of each edit unit is a header of the edit unit. In the edit unit, the system portion is followed by sub video data (picture). The sub video data is followed by sub audio data (sound). The sub video data are an elementary stream (ES) in accordance with the MPEG4 system. The sub audio data are composed of data of eight channels, data of two channels being paired.

An edit unit is sub video data and sub audio data for a reproduction duration (for example, 2 seconds) corresponding to one growth ring. In addition, one edit unit is composed of eight ECC blocks. The header portion is composed of one ECC block.

FIG. 12B shows an example of the structure of a sub video data storing portion in the case that the video system corresponds to the NTSC system. The video data storing portion starts with a portion "K" that represents the attribute of the next item. For example, the portion "K" represents that the next item is an elementary stream in accordance with the MPEG4 system. The portion "K" is followed by a portion "L". The portion "L" represents the data length of the next item. With the portions "K" and "L," sub video data or sub audio data of two channels are packed.

As shown in FIG. 12D, one GOP of sub video data is composed of a total of 10 frames of one I picture and nine P pictures. When the video system corresponds to the NTSC system, since the frame rate is 30 frames/second, if one growth ring corresponds to a reproduction duration of two seconds, as shown in FIG. 12B, one edit unit contains six GOPs. When the video system corresponds to the PAL system, since the frame rate is 25 frames/second, as shown in FIG. 12C, one edit unit contains five GOPs.

As shown in FIG. 12E, with respect to sub audio data, the first and second channels, the third and fourth channels, the fifth and sixth channels, and the seventh and eighth channels are paired. A pair of two channels is packed with the portions "K" and "L." A filler portion adjusts the data length of sub audio data with dummy data so that the data length of one edit unit becomes eight ECC blocks. The filler portion is packed with the portions "K" and "L."

One pair of channels is arranged as shown in FIG. 12F. In other words, samples of two channels are alternately arranged. When the video system corresponds to the NTSC system, 16016 samples of sub audio data are packed in a pair of two channels. When the video system corresponds to the PAL system, 16000 samples of sub audio data are packed in a pair of two channels.

Figure 12:
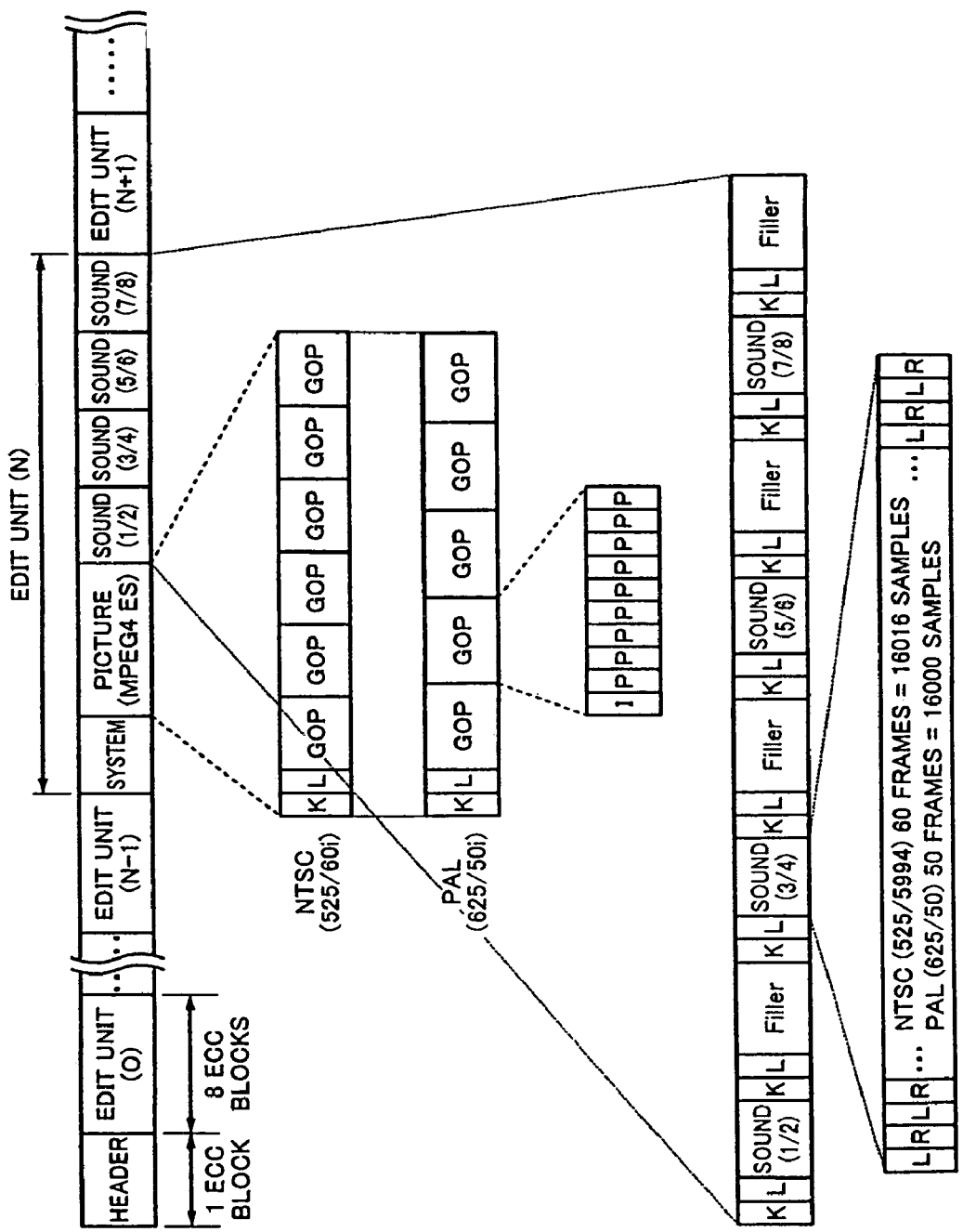
FIG. 12A, FIG. 12B, FIG. 12C, FIG. 12D, FIG. 12E, and FIG. 12F are schematic diagrams showing an example of the format of sub AV data.
Figure 13:
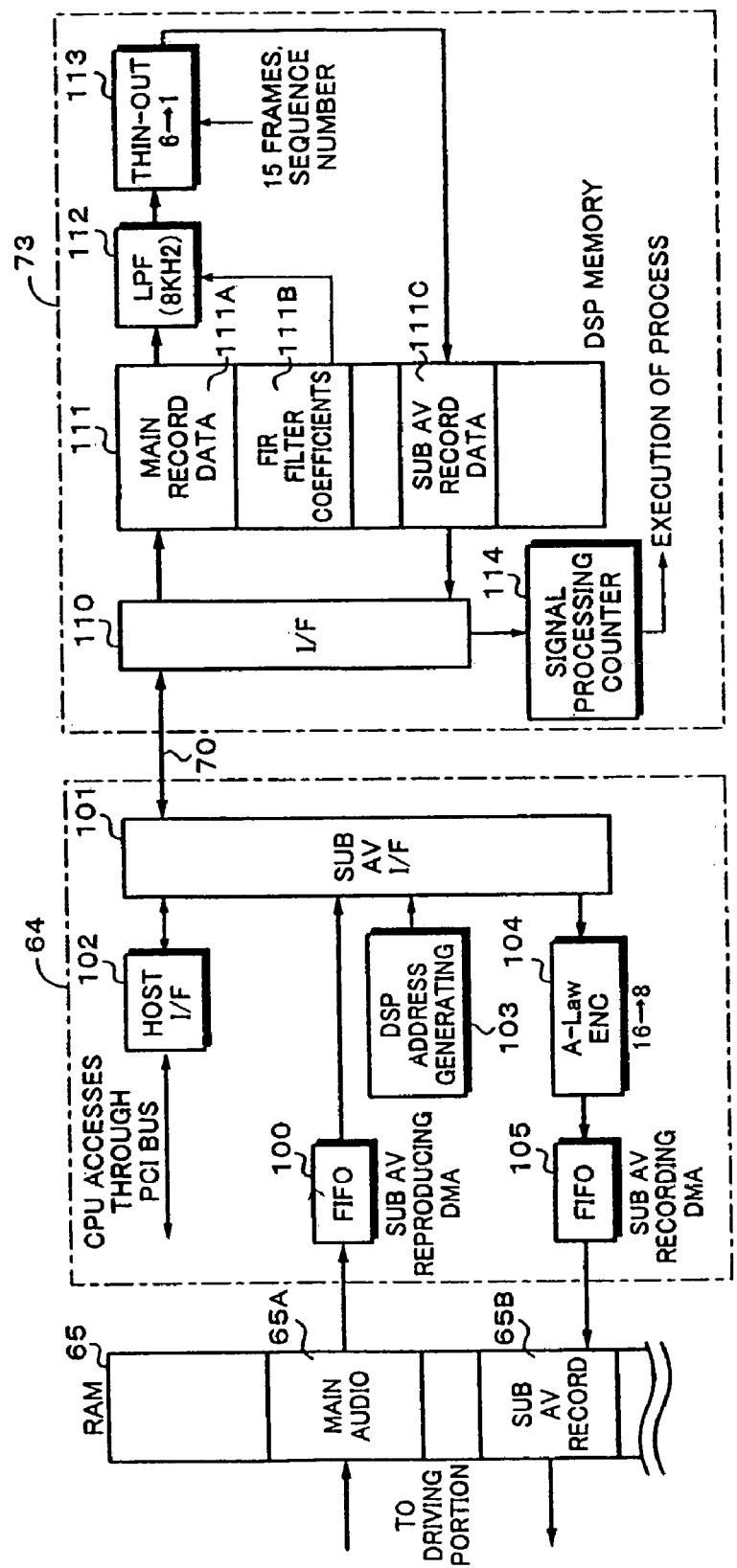
FIG. 13 is a schematic diagram showing an example of a recording operation for sub audio data.

Next, with reference to FIG. 13 and FIG. 14, a recording operation and a reproducing operation performed by the recording and reproducing apparatus for sub audio data will be described. FIG. 13 shows an example of the recording operation for sub audio data. In FIG. 13, similar portions to those in FIG. 12 are denoted by similar reference numeral and their detailed description will be omitted. Sub AV data are generated with main AV data. Along with main AV data, sub AV data are recorded onto the optical disc 1. Main audio data (hereinafter referred to as main audio data) of main AV data that are input from an input terminal 82 are written to an area 65A of a RAM 65. It is assumed that the main audio data have been sampled at 48 kHz and quantized with 16 bits.

The main audio data, which are input from the input terminal 82, are written to the area 65A of the RAM 65. The main audio data are supplied to the FPGA 64. The main audio data are temporarily stored in a first-in-first-out (FIFO) 100 disposed in the FPGA 64. The main audio data are read from the FPGA 64 at timing adjusted by the FIFO 100. The main audio data are supplied to a sub AV audio interface (I/F) 101. The sub AV audio I/F 101 accesses a bus 60 through a host I/F 102. While the sub AV audio I/F 101 is exchanging commands and data with a CPU 61, the sub AV audio I/F 101 controls flows of various types of data and timing of inputs/outputs thereof.

A DSP address generating portion 103 generates addresses for a sub AV data audio DSP 73. The DSP address generating portion 103 supplies the generated addresses to the sub AV data audio DSP 73 through the sub AV audio I/F 101.

The sub AV audio I/F 101 reads main audio data from the FIFO 100 in accordance with an instruction received from the CPU 61 through the host I/F 102 and supplies the main audio data to the sub AV data audio DSP 73 through a bus 70 as a DSP host bus. The main audio data are received by an interface 110 of the sub AV data audio DSP 73. A signal processing counter 114 generates a counter that executes a process of the sub AV data audio DSP 73 in accordance with received data and supplies the counter to each portion of the sub AV data audio DSP 73.

The main audio data are output from the interface 110 and stored in an area 111A of a DSP memory 111. Main audio data that are read at predetermined timing from the DSP memory 111 are supplied to a low pass filter 112 that has a cut off frequency of 4 kHz. The low pass filter 112 cuts off frequency components higher than 4 kHz and supplies the resultant frequency components to a thin-out circuit 113. The thin-out circuit 113 extracts every sixth sample so as to thin out the main audio data. With the thin-out process, the main audio data that have been sampled at 48 kHz are down-sampled at 8 kHz. Thus, the data amount of the main audio data is decreased to one-sixth thereof.

The low pass filter 112 is a fine impulse response (FIR) filter having for example 512 taps. Filter coefficients of the low pass filter 112 are supplied from an area 111B of the DSP memory 111.

Audio data that are output from the thin-out circuit 113 are stored in an area 111C of the DSP memory 111. After a predetermined amount of data has been stored in the area 111C, the audio data are read from the area 111C and supplied to the FPGA 64 through the interface 110 and the bus 70.

Audio data that have been down-sampled by the sub AV data audio DSP 73 and supplied to the FPGA 64 are supplied to an A-Law encoder 104 by the sub AV audio I/F 101. The A-Law encoder 104 instantaneously compresses each sample of the supplied audio data so as to convert audio data quantized with 16 bits into audio data sampled with eight bits.

The 1/6 compression in the chronological direction of the thin-out process by the thin-out circuit 113 and the 1/2 compression of the word compression by the A-Law encoder 104 decrease the data amount of main audio data to one-twelfth of the original main audio data. In such a manner, sub audio data are generated with main audio data. The sub audio data are written to an area 65B of the RAM 65 through a FIFO 105. When a predetermined amount of sub audio data is written to the RAM 65, the sub audio data are read from the RAM 65 and sent to the driving portion 10.

Figure 14:
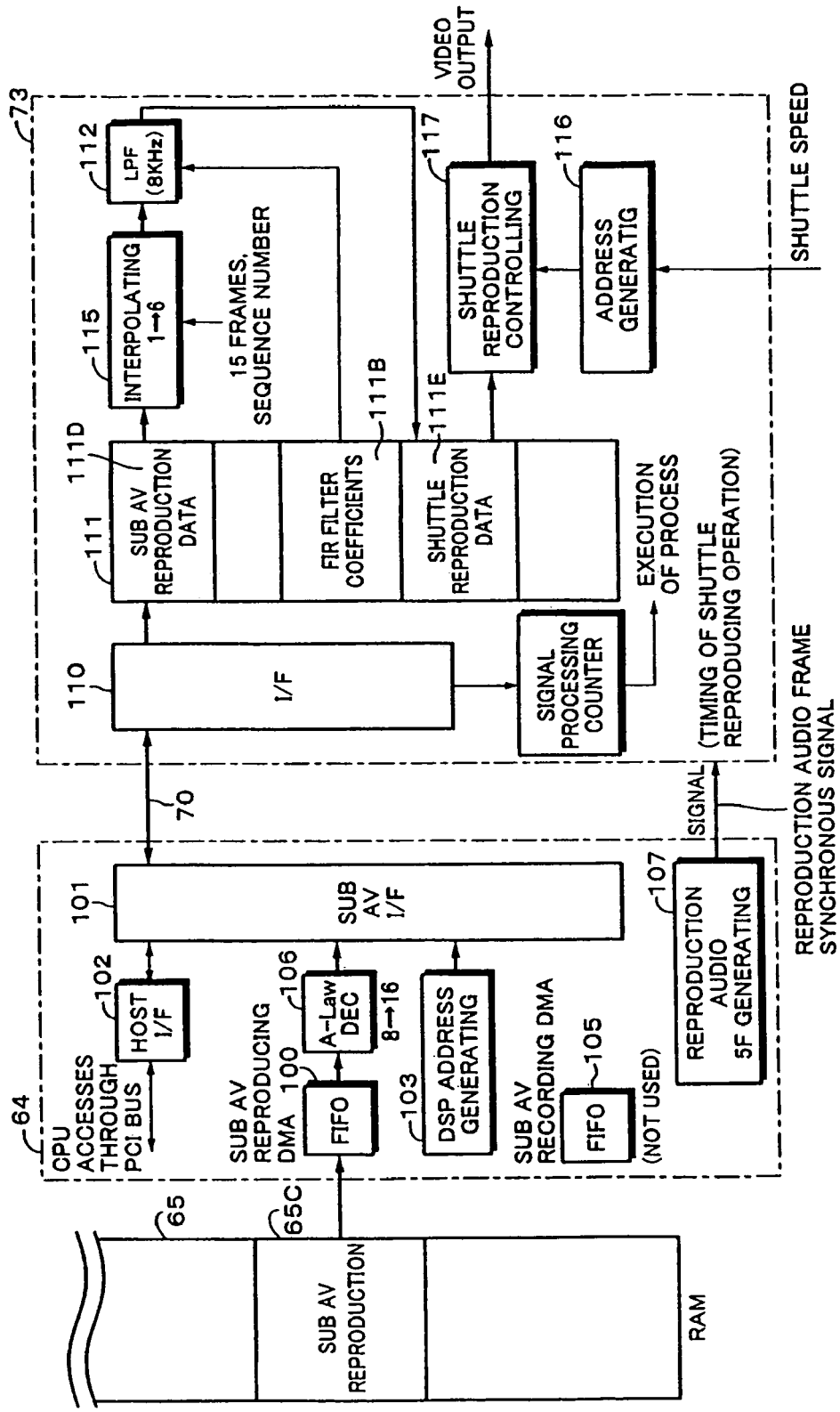
FIG. 14 is a schematic diagram showing an example of a recording operation for sub audio data.

FIG. 14 shows an example of the reproducing operation for sub audio data. In FIG. 14, similar portions to those in FIG. 11 and FIG. 13 are denoted by similar reference numerals and their description will be omitted. Sub audio data of sub AV data that are read along with main AV data are written to an area 65C of a RAM 65. The sub audio data are supplied to an A-Law decoder 106 through an FIFO 100. The A-Law decoder 106 instantaneously decompresses each sample of the sub audio data that have been compressed in accordance with the A-Law system so as to convert sub audio data quantized with eight bits into sub audio data quantized with 16 bits. The sub audio data quantized with 16 bits are supplied to a sub AV data audio DSP 73 through a sub AV audio I/F 101. The sub audio data are received by an interface 110 of the sub AV data audio DSP 73.

The sub AV data are output from the interface 110 and stored in an area 111D of a DSP memory 111. Sub audio data that are read at predetermined timing from the DSP memory 111 are supplied to an interpolating circuit 115. Five 0's are inserted between each sample. With this interpolating process, the sub audio data sampled at 8 kHz are up-sampled at 48 kHz. The A-Law decoder 106 and the interpolating circuit 115 cause sub audio data to be sampled at 48 kHz and quantized with 16 bits. Thus, the format of the sub audio data becomes the same as the format of main audio data.

Sub audio data that are output from the interpolating circuit are integrated by a low pass filter 112 and stored in an area 111E of the DSP memory 111. The sub audio data stored in the area 111E are output through a shuttle reproduction controlling portion 117. At that point, it is preferred to compensate the sound volume by increasing the level of the output data by six times.

The shuttle reproduction controlling portion 117 controls the reading operation for sub audio data stored in the area 111E and performs the shuttle reproducing operation (variable speed reproducing operation) for the sub audio data. When a predetermined operation is performed in the operating portion 42, the CPU 61 generates a shuttle speed signal and supplies the signal to a shuttle reproduction address generating portion 116. The shuttle reproduction address generating portion 116 generates read addresses of sub audio data stored in the area 111E of the DSP memory 111 in accordance with the supplied shuttle speed signal.

When the shuttle speed signal causes data to be reproduced at twice speed of the recording speed, addresses are generated so that every second sample of sub audio data is read from the area 111E. The addresses are supplied to the shuttle reproduction controlling portion 117. The shuttle reproduction controlling portion 117 reads sub audio data from the area 111E of the DSP memory 111 in accordance with the supplied addresses and outputs the sub audio data. When a particular shuttle speed is designated, data between each sample are interpolated by for example the interpolating process so as to generate samples at positions corresponding to the clock. It is preferred to use Lagrange interpolation as the interpolating process so as to obtain high quality sound. Of course, linear interpolation may be used as a simpler interpolating process.

As will be described later, when sub audio data are recorded, since the low pass filter 112 cuts off frequency components of 4 kHz or higher, the reproducing speed can be successively varied up to six times reproducing speed.

In the FPGA 64, a reproduction audio 5F generating portion 107 generates a frame synchronous signal in accordance with main AV data read from the optical disc 1 and supplied from the driving portion 10. The frame synchronous signal is supplied to the sub AV data audio DSP 73. The sub AV data audio DSP 73 controls the reproducing operation for audio data in synchronization with the frame synchronous signal.

When video data of main AV data corresponds to the NTSC system, 1602 samples and 1601 samples are alternately repeated at intervals of five frames. When the video system corresponds to the NTSC system, the reproduction audio 5F generating portion 107 generates a frame synchronous signal at intervals of five frames. When the shuttle reproducing operation is performed, the interval of the frame synchronous signal is varied in accordance with the shuttle speed. The shuttle reproduction controlling portion 117 reads sub audio data from the area 111E of the DSP memory 111 and controls the shuttle reproducing operation for the sub audio data in accordance with the frame synchronous signal.

Next, the generation of sub audio data will be described in detail. Sub audio data should be able to be edited in synchronization with video data. Thus, when sub audio data are generated, it is preferred to perform an instantaneous compressing process for compressing each sample of audio data. An instantaneous compressing process is performed by a combination of the sampling frequency converting process for compressing data in the chronological direction and the logarithmic compressing process for compressing the word length. As the instantaneous compressing process, the A-Law system is used.

In the A-Law system and µ-Law system related thereto, the word length is compressed in such a manner that when the amplitude of data is small, a small quantizer step is set and when the amplitude of data is large, a large quantizer step is set. In the A-Law system, a curve of a compression characteristic is approximated by 13 lines. The A-Law system has been mainly used in European countries for PCM system for telephone voice. In contrast, in the µ-Law system, a curve of a compression characteristic is approximated by 15 lines. The µ-Law system has been mainly used in Japan and the United States for PCM system for telephone voice. When the A-Law system or µ-Law system that is an instantaneous compressing system as a compressing system for audio data is used, video data can be more accurately synchronized with video data than the advanced audio coding (AAC) system or audio compression-3 (AC-3) system that is a semi-instantaneous compressing system are used.

As described above, the pass band of sub audio data that are recorded is restricted. As a result, audio data can be reproduced at a variable speed up to predetermined times speed. First of all, with reference to FIG. 15, a process for generating sub audio data will be described. Sub audio data are generated with main audio data that are down-sampled by a low pass filter (LPF) 131, a thin-out portion 132, and a compressing portion 133 in the following manner.

Main audio data are input to a LPF 131. The LPF 131 cuts off a signal of an unnecessary frequency region in accordance with a sampling frequency at which the main audio data are down-sampled. When the main audio data sampled at 48 kHz are down-sampled at 8 kHz, the low pass filter 131 cuts off a frequency of 4 kHz. When the LPF 131 is a linear phase FIR (Finite Impulse Response) filter, the deterioration of the sound quality can be minimized. An FIR filter having a pass band of 3.5 kHz and 512 taps may be used.

Audio data from which a signal of the unnecessary frequency region has been cut off by the LPF 131 are input to the thin-out portion 132. The thin-out portion 132 thins out samples so as to convert the sampling frequency. When main audio data sampled at 48 kHz are down-sampled at 8 kHz, the thin-out portion 132 extracts every sixth sample from successive audio data. As a result, audio data are thinned out to one-sixth of the original audio data. Thus, the size of audio data is compressed to one-sixth in the chronological direction of the original audio data.

Audio data that have been thinned out by the thin-out portion 132 are input to the compressing portion 133. The compressing portion 133 converts audio data quantized with 16 bits into audio data quantized with eight bits in accordance with a logarithmic compressing process of the A-Law system. As a result, the word length of audio data is compressed to the half of the original audio data. Thus, in addition to the thin-out process of the thin-out portion 132, the data size of the audio data is compressed to one-twelfth of the original audio data. The compressing system of the compressing portion 133 may be another compressing system such as the μ-Law system rather than the A-Law system.

As described above, the down-sampling processing portion converts main audio data sampled at 48 kHz and quantized with 16 bits into sub audio data sampled at 8 kHz and quantized with eight bits. The sub audio data are written to the RAM 65.

Next, with reference to FIG. 16, a converting process from sub audio data into reproduction audio data will be described. Sub audio data are up-sampled by an decompressing portion 134, a zero-filling portion 135, a low pass filter 136, and a amplifying portion 137 and converted into reproduction audio data.

First of all, sub audio data are input to the decompressing portion 134. The decompressing portion 134 logarithmically decompresses the sub audio data in accordance with the A-Law system so as to converts the number of quantizer bits from eight bits into 16 bits. When the decompressing portion 134 and the compressing portion 133 convert the number of quantizer bits, it is preferred to use a pre-created input/output conversion table so as to decrease the number of calculations. With the table, a digital signal processor (DSP) can easily perform a process in real time.

The audio data decompressed by the decompressing portion 134 are input to the zero-filling portion 135. The zero-filling portion 135 inserts a predetermined number of samples whose values are zeros between each sample of the input audio data. When sub audio data sampled at 8 kHz are up-sampled at 48 kHz, five samples whose values are zeros are inserted into each sample of the input audio data.

Audio data into which zeros have been inserted by the zero-filling portion 135 are input to the low pass filter 136. The low pass filter 136 cuts off a signal of an unnecessary frequency region from the audio data. When audio data sampled at 8 kHz are up-sampled at 48 kHz, the low pass filter 136 cuts off a frequency of 4 kHz. When the low pass filter 136 is a linear phase FIR filter, the deterioration of the audio quality can be minimized. The low pass filter 136 may be an FIR filter having a pass band of 3.5 kHz and 512 taps. Thus, the characteristics of the low pass filter 136 are the same as the characteristics of the low pass filter 131. The low pass filter 131 and the low pass filter 136 can be used in common.

Audio data from which a signal of an unnecessary frequency region has been cut out by the low pass filter 136 are supplied to the amplifying portion 137. The amplifying portion 137 amplifies the audio data. Audio data that have been input from the low pass filter 136 have been filled with zeros. Thus, the audio data that have been input to the low pass filter 136 have lower energy by zeros than main audio data that have been input to the low pass filter 131 To compensate the lower energy, the amplifying portion 137 amplifies the audio data that have been input to the low pass filter 136. In this example, since the zero-filling portion 135 fills samples with five zeros, the amplifying portion 137 amplifies the amplitude of the audio data with an amplification factor of 6.

As described above, the up-sampling processing portion converts sub audio data sampled at 8 kHz and quantized with eight bits into reproduction audio data sampled at 48 kHz and quantized with 16 bits. The reproduction audio data converted from the sub audio data are written to the RAM 65.

Figure 17A:
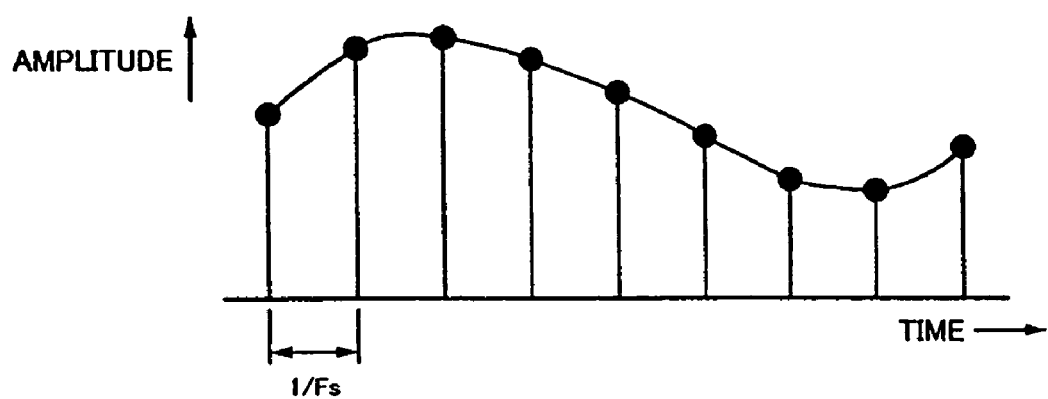
FIG. 17A and FIG. 17B are graphs showing a waveform and a frequency spectrum of an example of an original sound of sub audio data, respectively.
Figure 17B:
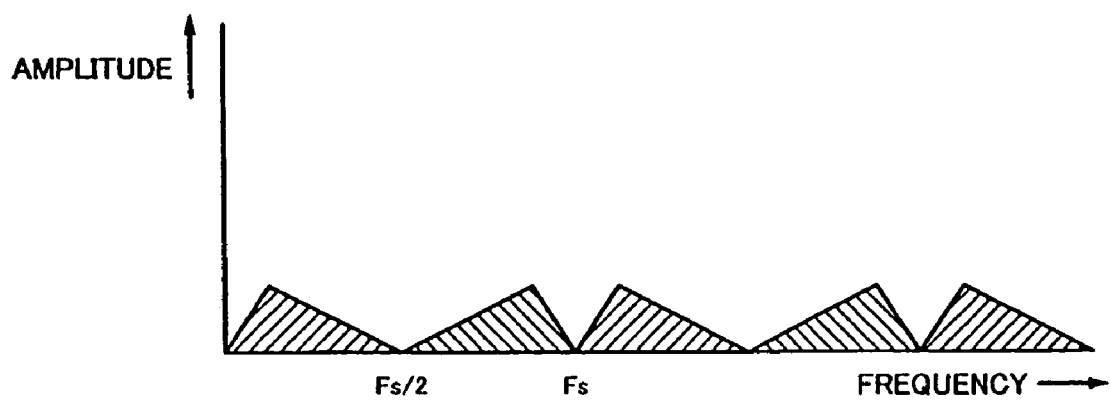

Next, the variable speed reproducing operation performed by the foregoing converting process for sub audio data will be described. Now, it is assumed that the waveform and frequency spectrum of an original sound of sub audio data are as shown in FIG. 17A and FIG. 17B, respectively. FIG. 17A shows a time base waveform of an original sound in the case that the vertical axis and the horizontal axis represent amplitude and time, respectively. FIG. 17B shows a frequency spectrum of an original sound in the case that the vertical axis and horizontal axis represent amplitude and frequency, respectively. These notations apply to FIG. 18A, FIG. 18B, FIG. 19A, FIG. 19B, FIG. 19C, and FIG. 19D. In these figures, Fs represents a sampling frequency.

Figure 18A:
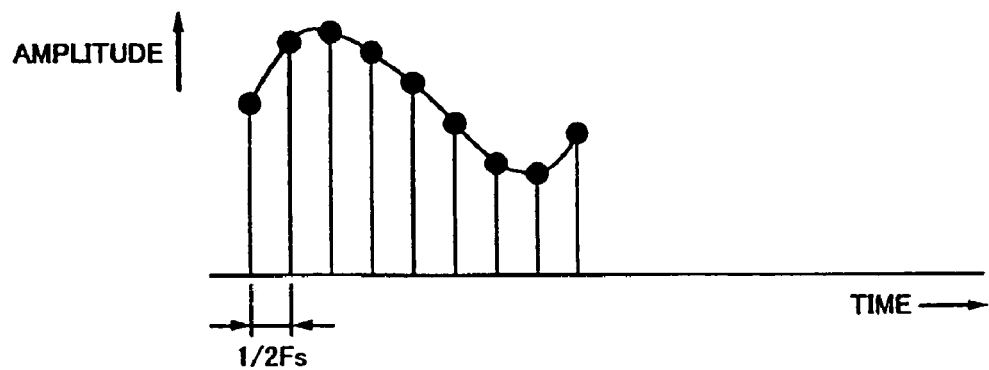
FIG. 18A and FIG. 18B are graphs showing the case in which the sampling frequency of sub audio data is increased by two times.
Figure 18B:
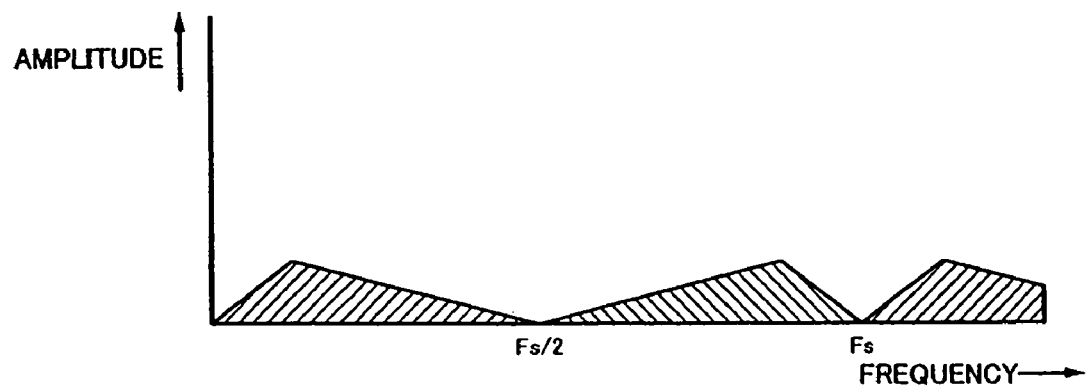

Now, it is considered that an original sound having signal characteristics shown in FIG. 17A and FIG. 17B is reproduced at two times speed, namely in the half reproduction duration of the original sound (hereinafter referred to as two times speed reproducing operation). When the sampling frequency of the original sound shown in FIG. 17A and FIG. 17B is increased by two times, the two times speed reproducing operation can be performed. FIG. 18A to FIG. 18D show a waveform in this case. When the sampling frequency is increased by two times as shown in FIG. 18A, as represented by the frequency spectrum shown in FIG. 18B, the pitch of the audio data is increased by two times.

Figure 19A:
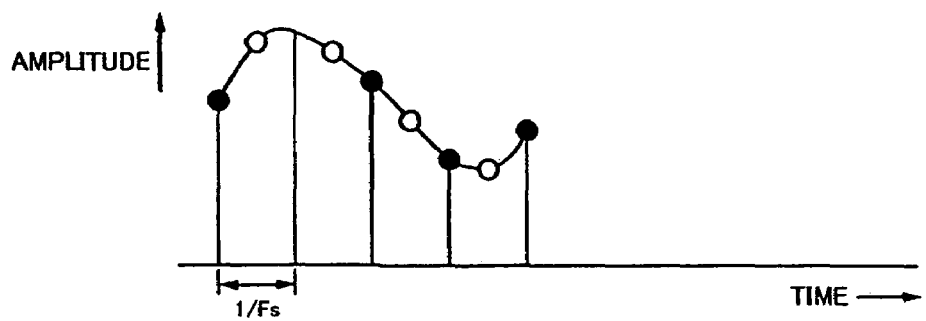
FIG. 19A, FIG. 19B, FIG. 19C, and FIG. 19D are graphs showing an example where the sampling frequency of sub audio data is increased by two times and the sub audio data are thinned out.
Figure 19B:
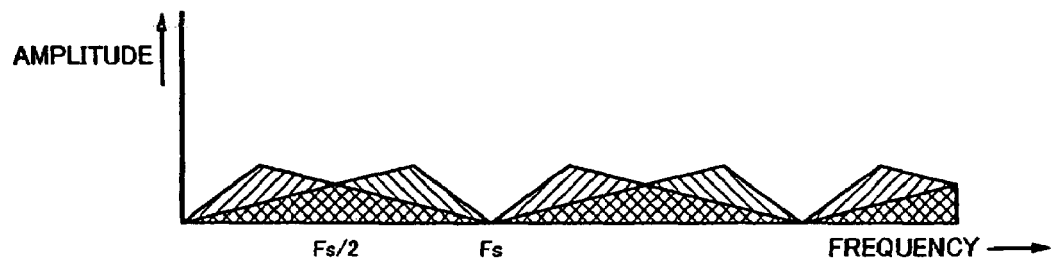
Figure 19C:
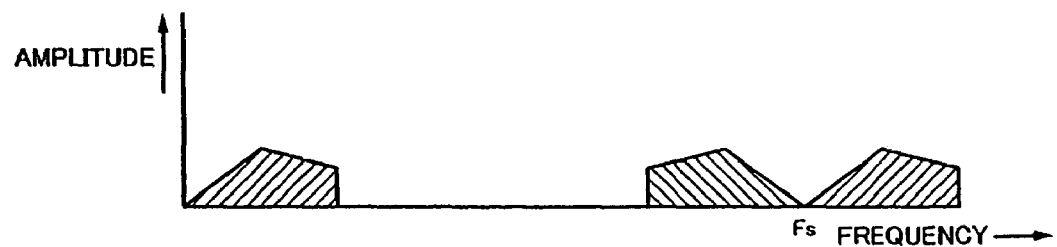
Figure 19D:
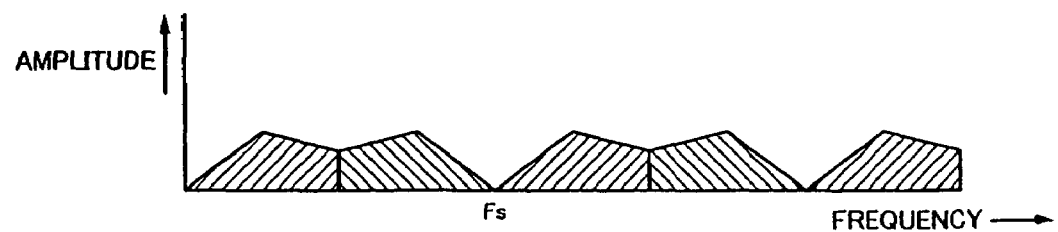

When the sampling frequency of audio data is increased by two times, the audio data cannot be output as it is as shown in FIG. 18A. Thus, the two times sampling frequency should be restored to the original sampling frequency. When the audio data are simply thinned out and the two times sampling frequency is decreased to the original sampling frequency, as denoted in a frequency spectrum shown in FIG. 19B, aliasing takes place. Thus, as shown in FIG. 19C, when a band of audio data is restricted by a low pass filter and then the audio data are thinned out, aliasing does not take place as shown in FIG. 19D.

When sub audio data are generated, if the band is restricted and the sampling frequency is down-sampled to one-n-th of the original frequency, the process of the low pass filter for removing aliasing that takes place in a high speed reproducing operation for sub audio data can be omitted until the N times speed reproducing operation is performed. When sub audio data are generated, since the thin-out portion 132 down-samples audio data at ⅙ of the original sampling frequency, the reproduction side does not need a low pass filter that removes aliasing until a six times speed reproducing operation is performed. Thus, until a six times speed reproducing operation is performed, the reproducing speed of the sub audio data can be successively varied while the audio quality is kept high.

Thus, as if a fast forward reproducing operation were performed with an analog audio tape, a sound can be successively reproduced from the optical disc 1 at high speed. A reproduction sound shortly breaks at a change point of a video clip, an edit point, and a scene change point. In addition, the quality of a reproduction sound often varies at these points. They are audible. Thus, according to the embodiment of the present invention, as if an analog tape were used, a reproduction sound can be successively output from the optical disc 1 at high speed. With this feature, clips and edit points can be searched.

On the other hand, when audio data are reproduced in a longer reproduction duration (not shown) than the original reproduction duration, if the sampling frequency is simply decreased, the pitch is decreased. The audio sound can be compensated by zero-filling method or the like so as to increase the sampling frequency by two times. In this case, aliasing takes place. However, when the band of the signal that has been filled with zeros is restricted and interpolated by the low pass filter, aliasing can be prevented.

Next, the arrangement of sub audio data in the memory will be described. FIG. 20 shows an outline of a flow of sub audio data that are reproduced by the recording and reproducing apparatus. When the sub audio data are reproduced, they are read from the optical disc 1. The sub audio data are temporarily stored in the RAM 65. The sub audio data stored in the RAM 65 are supplied to the sub AV data audio DSP 73. As described with reference to FIG. 16, the sub AV data audio DSP 73 performs an up-sampling process such as a sample rate converting process (form 8 kHz to 48 kHz) for sub audio data supplied from the RAM 65 so as to convert the sub audio data into reproduction audio data. The reproduction audio data converted by the sub AV data audio DSP 73 are output from the output terminal 81.

As shown in FIG. 12, one growth ring is composed of data corresponding to a reproduction duration for 2 seconds. When the video system corresponds to the NTSC system, sub audio data of 60 frames per audio channel are embedded in one/growth ring. Sub audio data that are read from the optical disc 1 are buffered as a growth ring in the RAM 65 that is first storing means. As was described above, each growth ring is composed of a pair of video data and audio data for a unit reproduction duration corresponding to a reproduction time zone. In other words, the RAM 65 stores sub audio data for each unit reproduction duration.

FIG. 21 shows an example of a mapping process for sub audio data to the RAM 65. Sub audio data are stored as growth rings in the RAM 65. As shown in FIG. 21, sub audio data of growth ring #N, growth ring #(N+1), and so forth are mapped to the RAM 65.

Sub audio data that have been read from the RAM 65 are transferred to the DSP memory 111 of the sub AV data audio DSP 73 that is second storing means and stored therein in the following manner. The sub audio data are transferred as a growth ring from the RAM 65 to the DSP memory 111 and written at successive addresses thereof. The sub audio data written in the DSP memory 111 are audio data that do not contain redundant data such as zeros. Thus, when data are written to successive addresses, data that are read from a connected point can be reproduced without a brake. Sub audio data stored in the DSP memory 111 are read as samples from the DSP memory 111.

As described above, when sub audio data are reproduced, the up-sampling portion shown in FIG. 16 converts the sample rate of the sub audio data into the sample rate (sampling frequency) of main audio data. After the sample rate has been converted, the low pass filter 136 should perform the process for the band of audio data that are chronologically successive. Thus, when the sub audio data are reproduced, samples twice as many as the number of taps of the low pass filter 136 are required. When the low pass filter 136 is an FIR filter having 512 taps, two sets of 256 samples of the reproduction sub audio data are required.

When sub audio data stored as growth rings in the RAM 65 are arranged at successive addresses of the DSP memory 111, sub audio data that are chronologically successive can be obtained.

Sub audio data are transferred from the RAM 65 to the DSP memory 111 in accordance with the reproducing speed. Now, it is considered that sub audio data are reproduced at a 35 times reproducing speed. In this case, sub audio data for 35 frames are read from the RAM 65 in one frame period (less than ⅟30 seconds in the case of the NTSC system), transferred to the DSP memory, and then stored therein. When sub audio data are reproduced from growth ring #N shown in FIG. 21 at the 35 times reproducing speed, sub audio data for 35 frames should be successively arranged in the DSP memory 111 in one frame period after the 35 times speed reproducing operation is started.

As described above, since sub audio data are stored as a growth ring in the RAM 65, as shown in FIG. 22, in one frame period after the 35 times speed reproducing operation is started, sub audio data for 60 frames of growth ring #N are transferred to the DSP memory 111 and arranged at successive addresses. In other words, sub audio data for 25 frames reproduced in one frame period are read ahead.

Since sub audio data have been read ahead for 25 frames, in the next frame period, sub audio data need to be read for 10 frames from the RAM 65 and arranged at successive addresses of the DSP memory 111. Sub audio data are stored as a growth ring in the RAM 65. Sub audio data for 60 frames in the growth ring #(N+1) are transferred to the DSP memory 111 and arranged at successive addresses thereof. In this case, sub audio data for 50 frames (60−10=50) are read ahead for reproduction data in the next frame period. In the next frame period, since sub audio data for 50 frames have been read ahead, the sub audio data that have been read ahead are used.

Since the data rate of sub audio data is low, data for 35 frames can be obtained in one frame period. In other words, since all sub audio data (data of 35 frames in one frame period in the 35 times speed reproducing operation) are arranged in the DSP memory 111, the audio quality of audio data that are searched is improved.

Sub audio data stored as a growth ring in the RAM 65 are arranged at successive addresses of the DSP memory 111 and the next growth ring data that are mapped are read ahead. Thus, sub audio data can be reproduced at very high speed such as 35 times speed of the recording speed of audio data to the optical disc 1.

It is preferred that main audio data be arranged in the memory of the audio DSP 72 in the same manner as sub audio data is arranged in the DSP memory 111. In this case, chronologically successive samples before and after growth ring data can be obtained. Up to the data rate at which audio data are read from the optical disc 1, the audio data can be reproduced at high speed.

Main audio data can be read from the optical disc 1 up to around two times reproducing speed. On the other hand, all sub audio data can be read from the optical disc 1 up to around 40 times reproducing speed. However, when audio data are reproduced at 35 times reproducing speed, the reproduced sound nearly becomes white noise. Thus, it becomes difficult to identify the sound. In this case, since the audio meter 93 displays a sound volume level almost in real time, whether a sound is present or absent can be visually identified. This feature is very effective to search a desired position such as a clip or an edit point of video data.

Sub audio data discretely recorded on the optical disc 1 are rearranged to successive data. The audio data are reproduced while the sample rate is being changed at any search speed. Thus, when audio data is searched, an audible sound can be output.

Audio data recorded in a chronologically divided shape as growth rings can be successively reproduced without a break, pause or other undesired disruption. Thus, when data of two growth rings are accessed and they are reproduced at high speed, sounds are successively connected at a connecting position of files. While the sampling rate of the audio data is being converted, the audio data can be seamlessly searched.

In the foregoing example, a high speed reproducing operation in the same chronological direction as a recording operation was described. However, it should be noted that the present invention is not limited to such an example. Since sub audio data are written at successive addresses of the DSP memory 111, when sub audio data are reproduced in the reverse direction of the recording operation, namely so-called reverse reproducing operation is performed, the sub audio data stored in the DSP memory 111 can be used. Thus, it is not necessary to read data from the optical disc 1.

In the foregoing example, data that are read from the optical disc 1 are recorded in the RAM 65. However, data stored in the RAM 65 are not limited to those. For example, when data that have a non-fixed length and/or that are asynchronous are supplied from the outside in accordance with FTP are stored in the RAM 65, the present invention can be applied. In this case, sub audio data that have a non-fixed length and that are asynchronous are read from the RAM 65 in the unit of which the data have been written. The sub audio data that are read are transferred to the DSP memory 111, written at successive addresses thereof, and then read as samples.

Likewise, the present invention can be applied to audio data recorded as files on the optical disc 1.

Next, a synchronizing process for video data and audio data will be described. As described above, the CPU 61 controls timing of inputs and outputs of the main video data and audio data and the sub video data and audio data to and from the RAM 65 with a frame synchronous signal (hereinafter referred to as video frame synchronous signal) corresponding to a video frame period.

The video frame synchronous signal is a signal that represents a timing period of video data. The CPU 61 controls the recording operation and the reproducing operation for video data and audio data. Thus, while monitoring the frame synchronous signal, when the CPU 61 issues an instruction that causes the recording operation or reproducing operation for audio data to be started, the phase of video data can be matched with the phase of audio data.

However, since the instruction issued by the CPU 61 is affected by its operation speed and the overhead of the operating system (OS) that is operated on the CPU 61, time for which the instruction is issued fluctuates. Thus, although the CPU 61 can match the phase of video data with the phase of audio data in each frame, it is difficult for the CPU 61 to match the phase of video data with the phase of audio data in the accuracy of a sampling period of the audio data (2 µs at a sampling frequency Fs of 48 kHz: $1/Fs = 1/48$ kHz=2 µs).

In addition, as described above, when audio data are input and output, a signal process such as a level adjustment is performed. Thus, when audio data are recorded, input audio data are written to the RAM 65 with a delay. Likewise, when audio data are reproduced, the audio data are read from the RAM 65 with a delay. Thus, when data are recorded, it is necessary to delay the writing operation for audio data that are input from the input terminal 82 and that are written to the RAM 65 corresponding the delay. Likewise, when audio data are reproduced, it is necessary to advance the reading operation for audio data that are read from the RAM 65 and that are output to the output terminal 81 corresponding to the delay.

According to the present invention, a frame synchronous signal (hereinafter referred to as audio frame synchronous signal) is generated with a video frame synchronous signal in consideration of the delay. With the generated audio frame synchronous signal, timing of input and output of audio data is controlled. There are two types of audio frame synchronous signals of which one type is used when audio data is recorded and the other type is used when audio data is reproduced.

Figure 23:
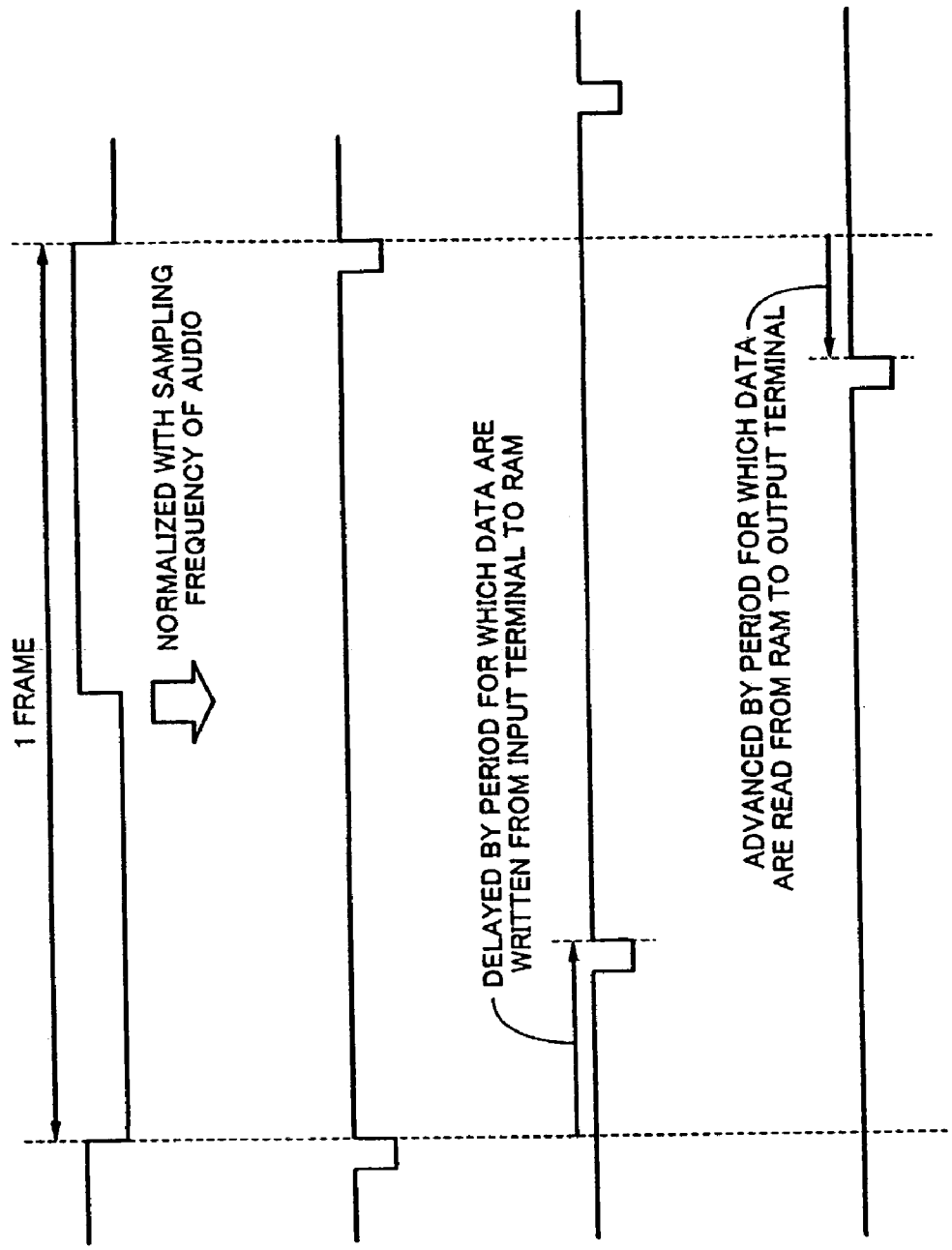
FIG. 23A, FIG. 23B, FIG. 23C, and FIG. 23D are timing diagrams showing examples of a video frame synchronous signal and an audio frame synchronous signal generated in accordance therewith.

FIG. 23A, FIG. 23B, FIG. 23C, and FIG. 23D show a timing chart showing examples of a video frame synchronous signal and an audio frame synchronous signal generated in accordance therewith. FIG. 23A shows the video frame synchronous signal. The video frame synchronous signal is normalized with the sampling frequency of audio data. As a result, the audio frame synchronous signal shown in FIG. 23B is generated.

As described above, when audio data are recorded, since the input audio data are written to the RAM 65 with a delay, the audio frame synchronous signal for the recording operation is set so that it is delayed against the video frame synchronous signal by the period for which the audio data are supplied from the input terminal 82 and written to the RAM 65. For example, the audio frame synchronous signal for the recording operation is delayed against the video frame synchronous signal by several ten samples. As a result, the audio frame synchronous signal for the recording operation is generated.

On the other hand, when audio data are reproduced, since the audio data are output from the RAM 65 with a delay, the audio frame synchronous signal for the reproducing operation is set so that it is advanced against the video frame synchronous signal by a period for which the audio data is read from the RAM 65 to the data output terminal. For example, the audio frame synchronous signal for the reproducing operation is advanced against the video frame synchronous signal by several ten samples, preferably more samples so that the audio data can be output before the video data in consideration of a period for which signals are processed outside.

Thus, the CPU 61 can handle audio data in accordance with the audio frame synchronous signal. As a result, audio data can be synchronized with video data in the accuracy of a sampling period. The delay amount of the audio frame synchronous signal can be obtained in accordance with a real process for audio data. This setting can be adjusted corresponding to each device by software.

The CPU 61 can set a write address of the RAM 65 for each video frame. When the CPU 61 knows the write address of the RAM 65 for the next frame, the CPU 61 can control the input audio DSP 71, the output audio DSP 72, and the sub AV data audio DSP 73 in accordance with the audio frame synchronous signal for the recording operation or the audio frame synchronous signal for the reproducing operation for each frame.

As described above, the number of audio samples of one frame in the NTSC system is different from that in the PAL system. When the video system corresponds to the PAL system, since the frame frequency is 25 Hz and the sampling frequency is 48 kHz, they are in an integer ratio (1920 times). Thus, the phase of video data is matched with the phase of audio data in each frame.

In contrast, when the video system corresponds to the NTSC system, since the frame frequency is 29.97 Hz and the sampling frequency of audio data is 48 kHz, they are not in an integer ratio. Thus, the phase of video data is matched with the phase of audio data every fifth frame. The numbers of samples of first to fifth frames in the five-frame sequence are: 1602 samples, 1601 samples, 1602 samples, 1601 samples, and 1602 samples. When the video system corresponds to the DV video system, the numbers of samples of first to fifth frames in the five-frame sequence are: 1600 samples, 1602 samples, 1602 samples, 1602 samples, and 1602 samples.

When the video system corresponds to the NTSC system, the audio frame synchronous signal is generated in accordance with the five-frame sequence. The audio frame synchronous signal is generated in a period on the basis of the five-frame sequence. When audio data is recorded on the optical disc 1, the phase of the audio frame synchronous signal for the recording operation is controlled so the audio data starts with the first frame. When audio data is reproduced, the phase of the audio frame synchronous signal for the reproducing operation is controlled so that the audio data starts with the first frame. Thus, the five-frame sequence can be managed so that phase of audio data that are recorded is matched with the phase of audio data that are reproduced. Alternatively, when audio data are recorded, the first frame sequence number is recorded onto the optical disc 1. The audio frame synchronous signal for the reproducing operation is controlled so that when audio data is reproduced, the audio data starts with the first frame.

When main audio data and sub audio data are synchronized for each sample, an error of the main audio data can be concealed with the sub audio data. When they are synchronized, the reproducing speed of audio data can be successively varied so that when the audio data are reproduced at high speed, the sub audio data are used and when the audio data are reproduced at low speed, the main audio data are used. When the reproducing speed is switched between low speed and high speed, the reproducing operation is switched between main audio data and sub audio data. As a result, the variable speed reproducing operation can be performed with high sound quality. Next, the synchronization of main audio data and sub audio data will be described.

Figure 24:
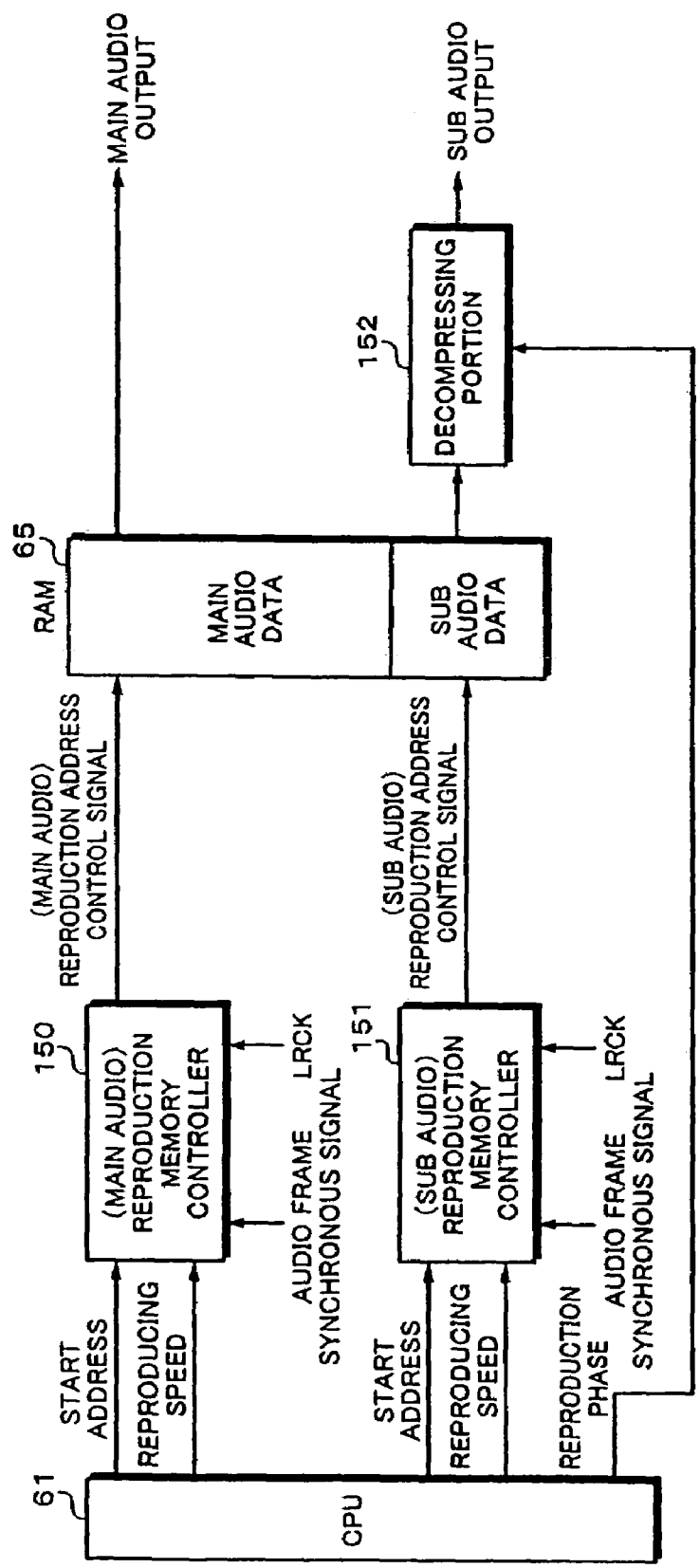
FIG. 24 is a block diagram showing an example of the structure for synchronizing main audio data and sub audio data for each sample.

FIG. 24 shows an example of the structure for synchronizing main audio data and sub audio data for each sample. In FIG. 24, similar portions to those in FIG. 11 are denoted by similar reference numerals and their description will be omitted. Reproduction memory controllers 150 and 151 are direct memory access (DMA) controllers that control main audio data and sub audio data that are read from a RAM 65. The reproduction memory controllers 150 and 151 are accomplished by for example an FPGA 64.

A clock LRCL as a clock signal corresponding to a sampling frequency of audio data and audio frame synchronous signal are supplied to the reproduction memory controllers 150 and 151. The CPU 61 inputs a start address that designates the read start position of the RAM 65 and a reproducing speed to the reproduction memory controllers 150 and 151. Thus, a reproduction address control signal that causes main audio data and sub audio data to be read from the RAM 65 is supplied from the reproduction memory controllers 150 and 151 to the RAM 65.

The frequency of the clock LRCK is 48 kHz. In this example, the reproducing speed is represented as a magnification of which the reproducing speed that is the same as the recording speed is the normal speed.

Main audio data and sub audio data that are recorded on the optical disc 1 (not shown) are set by the reproduction memory controllers 150 and 151 that control data transferred to the RAM 65 in accordance with time information of record data (for example "duration" of the file "INDEX.XML") recorded on the optical disc 1 and transferred to the RAM 65. The main audio data and sub audio data transferred to the RAM 65 are stored in different areas of the RAM 65.

When the CPU 61 sets the start address that represents the start position of the main audio data and sub audio data that are read from the RAM 65 and the reproducing speed to the reproduction memory controllers 150 and 151, the main audio data and sub audio data of the next frame are read from the RAM 65 and their reproducing operation is started. The sub audio data are supplied to a decompressing portion 152. As was described above, the decompressing portion 152 performs the A-Law decompressing process, low pass filter process, and zero-filling process for the sub audio data and outputs audio data that have the sampling frequency and the quantizer bits of the main audio data.

As will be described later, the CPU 61 supplies a reproduction phase signal to the decompressing portion 152. The decompressing portion 152 adds an offset of the sub audio data in the chronological direction in the up-sampling process, which is the zero-filling process, in accordance with the reproduction phase signal so as to adjust the reproduction phase of the sub audio data against the main audio data.

Figure 25:
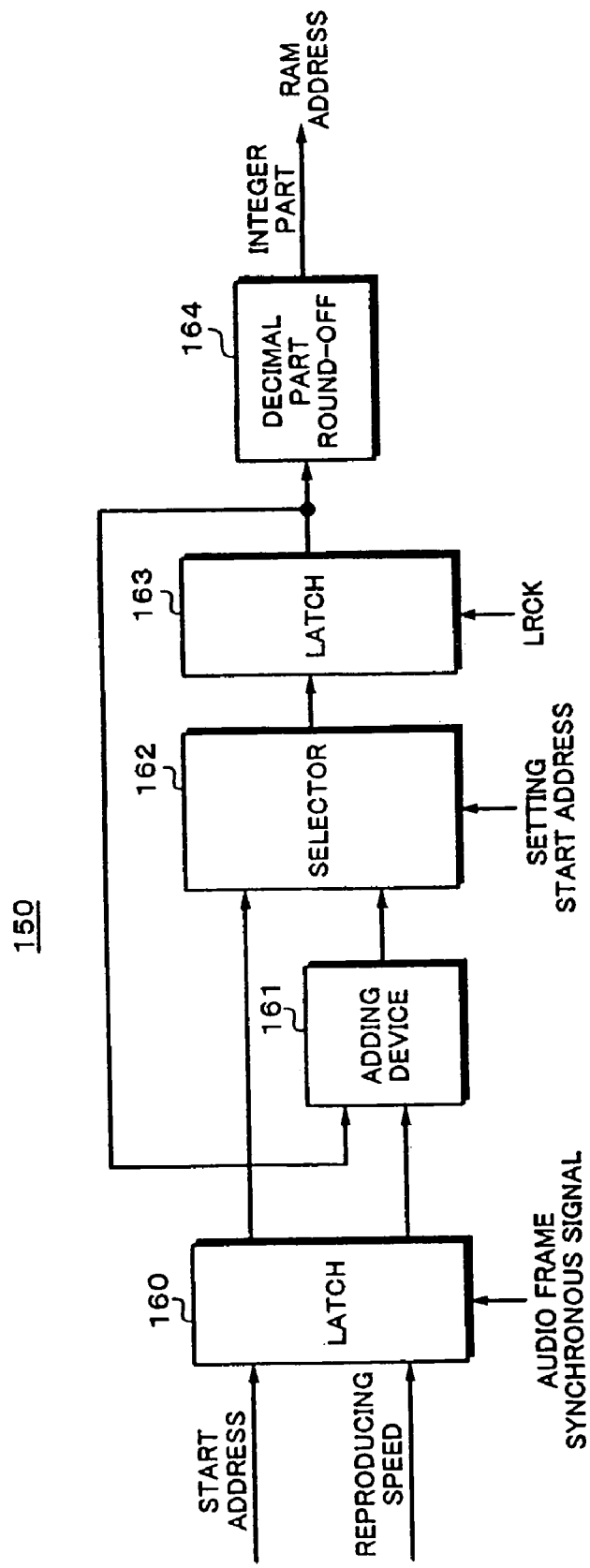
FIG. 25 is a block diagram showing an example of the structure of a reproduction memory controller that controls a reading operation of main audio data.

Next, with reference to FIG. 25, the reproduction memory controller 150 that controls the reading operation for main audio data will be described in detail. A start address and a reproducing speed are supplied to a latching circuit 160. The latching circuit 160 latches the start address and the reproducing speed. The start address and the reproducing speed are supplied to one input terminal of a selector 162 and an adding device 161 in accordance with an audio frame synchronous signal.

An output of the adding device 161 is supplied to another input terminal of the selector 162. When the CPU 61 sets the start address, the selector 162 selects the first input terminal. Otherwise, the selector 162 selects the second input terminal. In other words, the selector 162 selects the first input terminal and outputs the start address at timing of the audio frame synchronous signal. An output of the selector 162 is latched by a latching circuit 163 and output at timing of the clock LRCK. An output of the latching circuit 163 is supplied to a decimal part round-off portion 164 and an adding device 161. The adding device 161 adds a value that is output from the latching circuit 163 and the reproducing speed supplied from the latching circuit 160. An output of the latching circuit 163 is rounded off by the decimal part round-off portion 164. Only the integer part is output as a read address of the main audio data to the RAM 65.

In such a structure, the reproduction memory controller 150 cumulates the reproducing speed in the sampling period of the main audio data to the start address set by the CPU 61 and outputs the read address of the RAM 65 for the main audio data.

When the reproducing speed is the normal speed, which is the same as the recording speed, in each sampling period, the address is incremented by 1 such as 1, 2, 3, and so forth. When the reproducing speed is the two times speed, in each sampling period, the address is incremented by 2 such as 2, 4, 6, and so forth. In this case, the address corresponds to an audio sample that is read from the RAM 65.

With a 2 's complement of a decimal part of 12 bits and an integer part of eight bits, a reproducing speed from a low speed to a high speed can be represented.

Figure 26:
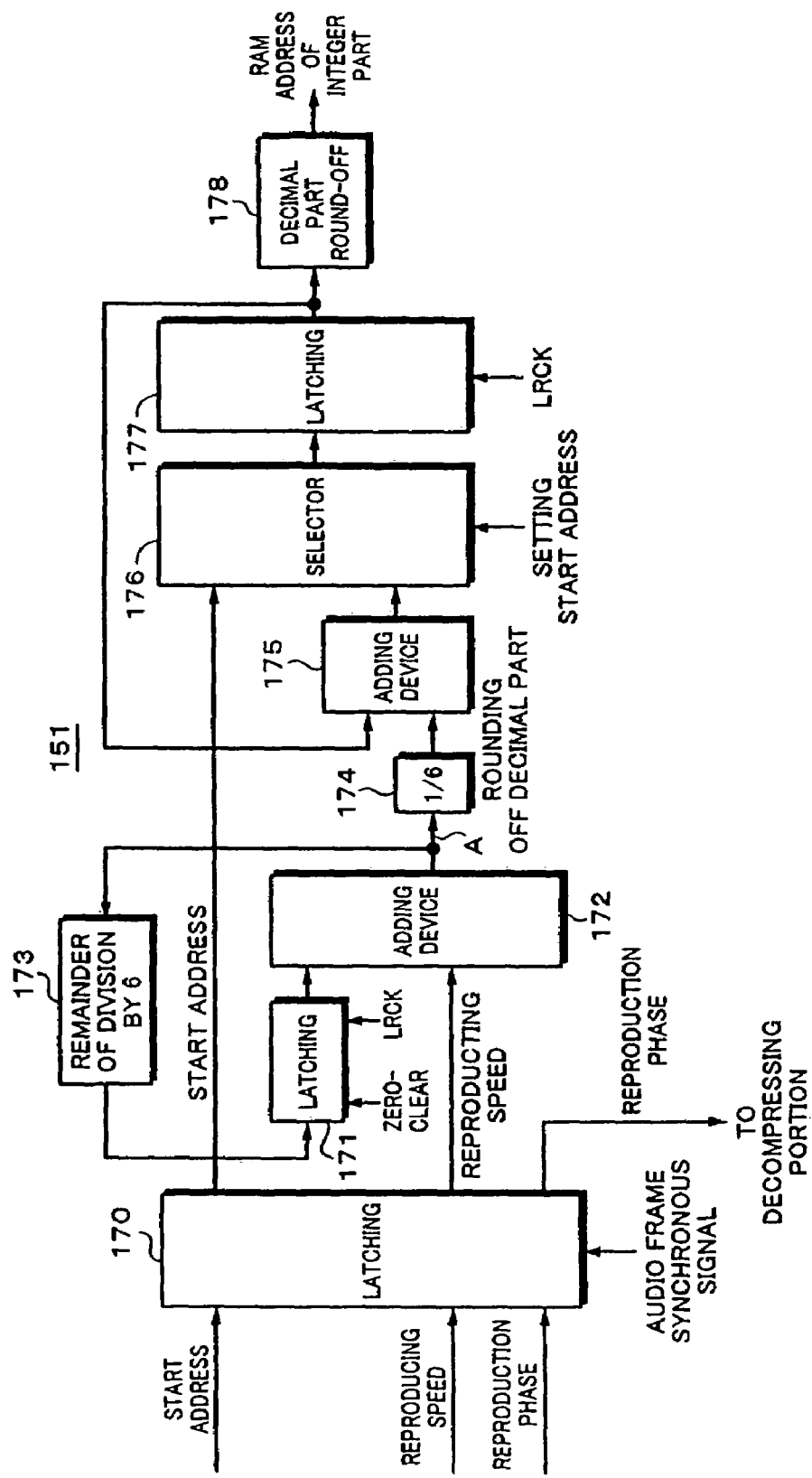
FIG. 26 is a block diagram showing an example of the structure of the reproduction memory controller that controls a reading operation of sub audio data.

FIG. 26 shows an example of the structure of the reproduction memory controller 151 that controls a reading operation for sub audio data. A start address and a reproducing speed are supplied to a latching circuit 170. The start address, the reproducing speed, and a reproduction phase are latched by the latching circuit 170. They are supplied to one input terminal of a selector 176, an adding device 172, and a decompressing portion 152 at timing of an audio frame synchronous signal.

An output of the adding device 172 is divided by the down-sampling ratio of the sub audio data to the main audio data (in this embodiment, the down-sampling ratio is 6). The integer part, namely quotient, is supplied to an adding device 175. The remainder is latched by a latching circuit 171. A value latched by the latching circuit 171 is output at timing of a clock LRCK. The adding device 172 adds the latched value of the latching circuit 171 and the reproducing speed. The latching circuit 171 is zero-cleared when the latched value matches the start address that has been set.

An output of the adding device 175 is supplied to the other input terminal of the selector 176. When the CPU 61 sets the start address, the selector 176 selects one input terminal. Otherwise, the selector 176 selects the other input terminal. In other words, the selector 176 selects the first input terminal in a period of the audio frame synchronous signal and outputs the start address. An output of the selector 176 is latched by the latching circuit 177 and output at timing of a clock LRCK. An output of the latching circuit 177 is supplied to a decimal part round-off portion 178 and an adding device 175. The adding device 175 adds the quotient of which the output of the adding device 172 is divided by 6 and the output of the latching circuit 177.

An output of the latching circuit 177 is supplied to the decimal part round-off portion 176. The decimal part round-off portion 176 rounds off the decimal part and outputs only the integer part as the read address of the sub audio data to the RAM 65.

In this example, since the sub audio data have been down-sampled at 8 kHz against the main audio data sampled at 48 kHz, the read addresses of the RAM 65 for the sub audio data are decreased to one-sixth of the read addresses of the RAM 65 for the main audio data. It can be considered that the reproducing speed is decreased to one-sixth against the main audio data. However, when the structure of the reproduction memory controller 151 is the same as the structure of the reproduction memory controller 150 shown in FIG. 25, if the reproducing speed is decreased to one-sixth and the start address is cumulated, the error thereof is cumulated. As a result, the reproduction addresses deviate.

To solve this problem, the remainder of which the output of the adding device 172 is divided by 6 as the down-sampling ratio is cumulated to the reproducing speed at timing of the clock CRCK. The quotient of which the added result of the adding device 172 is divided by 6 is cumulated to the start address at timing of the sampling clock LRCK. As a result, the read addresses of the RAM 65 for the sub audio data are obtained. Thus, the output of the latching circuit 177 is increased by a value corresponding to the reproducing speed in each sampling period of the sub audio data. As a result, the error of which the reproducing speed is decreased to one-sixth is not cumulated.

When the reproducing speed is the normal speed that is the same as the recording speed, the address is incremented by 1 such as 1, 2, 3, and so forth in each sampling period of the sub audio data, namely every sixth clock LRCK. When the reproducing speed is the two times speed, the address is incremented by 2 such as 2, 4, 6, and so forth every sixth clock LRCK.

Since the sub audio data has been down-sampled at 8 kHz against the main audio data sampled at 48 kHz, the data sequence of the sub audio data is six times rougher than the data sequence of the main audio data. Thus, as shown in FIG. 27A and FIG. 27B, the reproduction start point of the sub audio data may not match the reproduction start point of the main audio data.

FIG. 27A shows an example of a data sequence of main audio data. The sampling frequency of the main audio data is 48 kHz. Thus, each of data (samples) is arranged at an intervals of $\frac{1}{48}$ kHz. In contrast, the sampling frequency of sub audio data is 8 kHz. As shown in FIG. 27B, each of data (sample) is arranged at an interval of $\frac{1}{8}$ kHz that is six times larger than each of the main audio data. When the reproduction start point is other than the start sample of the main audio data, for example the third sample, the sub audio data do not have a sample corresponding to a sample of the main audio data. Thus, the reproduction start point of the main audio data does not match the reproduction start point of the sub audio data.

Thus, the start address of the sub audio data is set in consideration of the reproduction phase so that the roughness of the data sequence of the sub audio data is compensated and the reproduction start point of the main audio data is matched with the reproduction start point of the sub audio data.

The reproduction phase is an offset value of an 48 kHz sampling period against the start address. In the example of which the down-sampling ratio of the sub audio data to main audio data is 6, the offset value is set to 0 to 5. When the offset value is 0, the sub audio data are reproduced from the sample position sampled at 8 kHz. When the offset value is 2, as shown in FIG. 27B, the sub audio data are reproduced from the position advanced by $\frac{2}{48}$ kHz against the sample position at 8 kHz. The offset value is added when the sub audio data sampled at 8 kHz is up-sampled at 48 kHz. In the example shown in FIG. 14, the interpolating circuit 115 adds the offset value to the sub audio data. The offset value is given by the CPU 61.

As described above, when the main audio data and the sub audio data are synchronized, an error of main audio data can be concealed with sub audio data. Next, with reference to FIG. 28A, FIG. 28B, and FIG. 28C, the concealing process will be described in brief. As described above, an error correction code is added to each ECC block of record data and recorded onto the optical disc 1. If there is an error that cannot be corrected with the error correction code, the ECC portion 19 does not correct the error, but places an error flag at the error position.

As shown in FIG. 28A, when an error flag is placed in a particular ECC block (hatched in FIG. 28A) of main audio data, sub audio data corresponding to the ECC block is substituted for the main audio data having the error flag and the substituted sub audio data are output (FIG. 28B). When the error flag is not placed in the next ECC block of the main audio data, the output audio data are switched from the sub audio data to the main audio data. Since the main audio data and the sub audio data are synchronized in each sample, the reproduction sound can be smoothly switched between the main audio data and the sub audio data without a delay at the data switching point.

At the switching point between the main audio data and the sub audio data, the so-called cross fading process for gradually lowering the reproduction audio volume of one of them and gradually raising the reproduction audio volume may be performed (FIG. 28C). The cross fading process is performed by the FPGA 74 in accordance with an instruction received from the CPU 61. When the cross fading process is performed before and after an error portion, the switching point between the main audio data and the sub audio data can be smoothly reproduced.

Figure 29A:
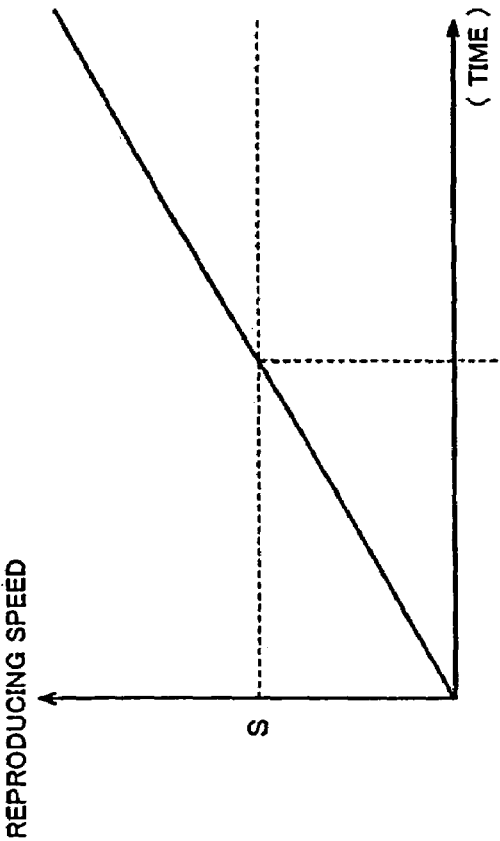
FIG. 29A, FIG. 29B, and FIG. 29C are timing diagrams showing a process for successively varying a reproducing speed.
Figure 29B:
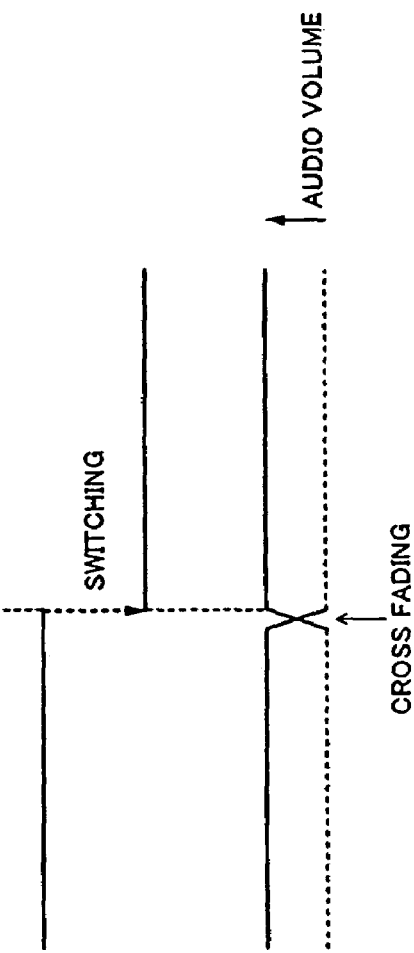

In addition, as described above, when the main audio data and the sub audio data are synchronized, the variable speed reproducing operation of which the reproducing speed is successively varied can be performed with high sound quality. Next, with reference to FIG. 29A, FIG. 29B, and FIG. 29C, the process for successively varying the reproducing speed will be described in brief. As shown in FIG. 29A, when the reproducing speed is successively varied, the variable speed reproducing operation is performed for the main audio data until the reproducing speed becomes S. When the reproducing speed that exceeds S is designated, the reproduced audio data are switched from the main audio data to the sub audio data (FIG. 29B). This operation applies to the case that the reproducing speed is varied from the high speed side to the low speed side. The reproducing speed S is a reproducing speed corresponding to the upper limit of data rate at which for example main audio data are reproduced from the optical disc 1.

Figure 29C:
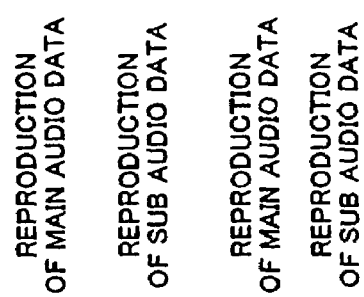

Likewise, in this case, as shown in FIG. 29C, when the cross fading process for the main audio data and the sub audio data is performed between the reproducing speed S and a slightly lower reproducing speed than the reproducing speed S, a switching point can be smoothly reproduced.

In the foregoing example, the present invention is applied to a format of which data are recorded as growth rings on the optical disc 1. However, the present invention is not limited to such an example. For example, the present invention can be applied to a conventional format of which data are recorded as files rather than growth rings.

Although the present invention has been shown and described with respect to a best mode thereof, it should be understood by those skilled in the art that the foregoing and various other changes, omissions, and additions in the form and detail thereof may be made therein without departing from the spirit and scope of the present invention.

What is claimed is:

1. A reproducing apparatus for reproducing video data and audio data that are paired as growth rings, each growth ring corresponding to a reproduction time zone for a unit reproduction duration, the reproducing apparatus comprising:
    first storing means for storing audio data read from the disc-shaped recording medium for the unit reproduction duration; and
    second storing means for storing audio data, the audio data being read as samples from the second storing means,
    wherein audio data stored in the first storing means is transferred for the unit reproduction duration to the second storing means such that any gaps in the audio data are removed and the audio data stored in the second storing means appears as a continuous sequence of audio samples, and such that the audio data stored in the second storing means can be reproduced at a non-normal reproduction speed with audible discontinuity occurring only at points where audio programs interface,
    wherein data is recorded on said disc-shaped recording medium in the form of allocation units and each of said allocation units has an amount of data that is equal to the amount of data in multiple reproduction duration units.

2. The reproducing apparatus as set forth in claim 1,
    wherein audio data recorded on the disc-shaped recording medium are sub audio data compressed with a higher compression rate than the main audio data and recorded as a growth ring along with the main audio data for the unit reproduction duration.

3. The reproducing apparatus as set forth in claim 1,
    wherein the audio data are transferred for the unit reproduction duration from the first storing means to the second storing means in accordance with a reproducing speed at which the audio data are reproduced.

4. The reproducing apparatus as set forth in claim 3,
    wherein the audio data stored in the second storing means are reproduced at a higher speed than a recording speed of audio data recorded on the disc-shaped recording medium.

5. The reproducing apparatus as set forth in claim 4,
    wherein the video data are synchronized with audio data that are reproduced at a higher speed than the recording speed of audio data recorded on the disc-shaped recording medium.

6. The reproducing apparatus as set forth in claim 5, further comprising:
    an audio meter for displaying the level of audio data that are read from the second storing means nearly in real time,
    wherein when audio data are reproduced at a higher speed than the recording speed of audio data recorded on the disc-shaped recording medium, a clip or an edit point of the video data can be searched in accordance with the indication of the audio meter.

7. The reproducing apparatus as set forth in claim 1,
    wherein audio data that has a non-fixed length and/or is asynchronous can be supplied to the first storing means, and
    wherein the audio data supplied to and stored in the first storing means are transferred to the second storing means for the unit reproduction duration, and
    wherein successive addresses are arranged in the second storing means and the audio data are written to the successive addresses.

8. The reproducing apparatus as set forth in claim 1,
    wherein said disc-shaped recording medium has two types of audio data stored thereon, main audio data and sub audio data, said sub audio data being audio data that is compressed with a higher compression ration than said main audio data.

9. The reproducing apparatus as set forth in claim 8,
    wherein upon reproduction from said disc-shaped recording medium said main audio data is reproduced and when a non-correctable error is detected in said main audio data, said sub audio data is reproduced in lieu of said main audio data.

10. The reproducing apparatus as set forth in claim 9,
    wherein switching between said main audio data and said sub audio data is accomplished by cross-fading.

11. The reproducing apparatus as set forth in claim 8,
    wherein upon variable speed reproduction from said disc-shaped recording medium said main audio data is reproduced until the difference between the reproduction speed and the normal reproduction speed exceeds a predetermined amount, and when the difference between the reproduction speed and the normal reproduction speed exceeds said predetermined amount said sub audio data is reproduced in lieu of said main audio.

12. The reproducing apparatus as set forth in claim 11, wherein switching between said main audio data and said sub audio data is accomplished by cross-fading.

13. The reproducing apparatus as set forth in claim 1, wherein the amount of data in a growth ring is an integer multiple of the amount of data in a minimum-size recording unit of said disc-shaped recording medium.

14. A reproducing method for reproducing video data and audio data that are paired as growth rings, each growth ring corresponding to a reproduction time zone for a unit reproduction duration, the reproducing method comprising the steps of:

storing audio data read from the disc-shaped recording medium for the unit reproduction duration to a first storing device; and storing audio data to a second storing device, the audio data being read as samples from the first storing device, wherein audio data stored in the first storing device is transferred for the unit reproduction duration to the second storing device such that any gaps in the audio data are removed and the audio data stored in the second storing device appears as a continuous sequence of audio samples and such that the audio data stored in the second storing device can be reproduced at a non-normal reproduction speed with audible discontinuity occurring only at points where audio programs interface, wherein said disc-shaped recording medium has two types of audio data stored thereon, main audio data and sub audio data, said sub audio data being audio data that is compressed with a higher compression ration than said main audio data, wherein upon reproduction from said disc-shaped recording medium said main audio data is reproduced and when a non-correctable error is detected in said main audio data, said sub audio data is reproduced in lieu of said main audio data.

15. The reproducing method as set forth in claim 14, wherein switching between said main audio data and said sub audio data is accomplished by cross-fading.

16. A reproducing method for reproducing video data and audio data that are paired as growth rings, each growth ring corresponding to a reproduction time zone for a unit reproduction duration, the reproducing method comprising the steps of:

storing audio data read from the disc-shaped recording medium for the unit reproduction duration to a first storing device; and storing audio data to a second storing device, the audio data being read as samples from the first storing device, wherein audio data stored in the first storing device is transferred for the unit reproduction duration to the second storing device such that any gaps in the audio data are removed and the audio data stored in the second storing device appears as a continuous sequence of audio samples and such that the audio data stored in the second storing device can be reproduced at a non-normal reproduction speed with audible discontinuity occurring only at points where audio programs interface, wherein said disc-shaped recording medium has two types of audio data stored thereon, main audio data and sub audio data, said sub audio data being audio data that is compressed with a higher compression ration than said main audio data, wherein upon variable speed reproduction from said disc-shaped recording medium said main audio data is reproduced until the difference between the reproduction speed and the normal reproduction speed exceeds a predetermined amount, and when the difference between the reproduction speed and the normal reproduction speed exceeds said predetermined amount said sub audio data is reproduced in lieu of said main audio.

17. The reproducing method as set forth in claim 16, wherein switching between said main audio data and said sub audio data is accomplished by cross-fading.

18. A reproducing method for reproducing video data and audio data that are paired as growth rings, each growth ring corresponding to a reproduction time zone for a unit reproduction duration, the reproducing method comprising the steps of:

storing audio data read from the disc-shaped recording medium for the unit reproduction duration to a first storing device; and storing audio data to a second storing device, the audio data being read as samples from the first storing device, wherein audio data stored in the first storing device is transferred for the unit reproduction duration to the second storing device such that any gaps in the audio data are removed and the audio data stored in the second storing device appears as a continuous sequence of audio samples and such that the audio data stored in the second storing device can be reproduced at a non-normal reproduction speed with audible discontinuity occurring only at points where audio programs interface, wherein the amount of data in a data in a growth ring is an integer multiple of the amount of data in a minimum-size recording unit of said disc-shaped recording medium.

19. A reproducing method for reproducing video data and audio data that are paired as growth rings, each growth ring corresponding to a reproduction time zone for a unit reproduction duration, the reproducing method comprising the steps of:

storing audio data read from the disc-shaped recording medium for the unit reproduction duration to a first storing device; and storing audio data to a second storing device, the audio data being read as samples from the first storing device, wherein audio data stored in the first storing device is transferred for the unit reproduction duration to the second storing device such that any gaps in the audio data are removed and the audio data stored in the second storing device appears as a continuous sequence of audio samples and such that the audio data stored in the second storing device can be reproduced at a non-normal reproduction speed with audible discontinuity occurring only at points where audio programs interface, wherein the data is recorded on said disc-shaped medium in the form of allocation units and each of said allocation units has am amount of data that is equal to the amount of data in multiple reproduction duration units.

20. A reproducing apparatus for reproducing video data and audio data that are paired as growth rings, each growth ring corresponding to a reproduction time zone for a unit reproduction duration, the reproducing apparatus comprising:

first storing means for storing audio data read from the disc-shaped recording medium for the unit reproduction duration;

second storing means for storing audio data, the audio data being read as samples from the second storing means; and an audio meter for displaying the level of audio data that are read from the second storing means nearly in real time, wherein when audio data are reproduced at a higher speed than the recording speed of audio data recorded on the disc-shaped recording medium, a clip or an edit point of the video data can be searched in accordance with the indication of the audio meter, wherein audio data stored in the first storing means is transferred for the unit reproduction duration to the second storing means such that any gaps in the audio data are removed and the audio data stored in the second storing means appears as a continuous sequence of audio samples, and such that the audio data stored in the second storing means can be reproduced at a non-normal reproduction speed with audible discontinuity occurring only at points where audio programs interface, wherein audio data recorded on the disc-shaped recording medium are sub audio data compressed with a higher compression rate than the main audio data and recorded as a growth ring along with the main audio data for the unit reproduction duration, wherein the audio data are transferred for the unit reproduction duration from the first storing means to the second storing means in accordance with a reproducing speed at which the audio data are reproduced, wherein the audio data stored in the second storing means are reproduced at a higher speed than a recording speed of audio data recorded on the disc-shaped recording medium, and wherein the video data are synchronized with audio data that are reproduced at a higher speed than the recording speed of audio data recorded on the disc-shaped recording medium.

21. A reproducing apparatus for reproducing video data and audio data that are paired as growth rings, each growth ring corresponding to a reproduction time zone for a unit reproduction duration, the reproducing apparatus comprising:

first storing means for storing audio data read from the disc-shaped recording medium for the unit reproduction duration; and second storing means for storing audio data, the audio data being read as samples from the second storing means, wherein audio data stored in the first storing means is transferred for the unit reproduction duration to the second storing means such that any gaps in the audio data are removed and the audio data stored in the second storing means appears as a continuous sequence of audio samples, and such that the audio data stored in the second storing means can be reproduced at a non-normal reproduction speed with audible discontinuity occurring only at points where audio programs interface, wherein audio data that has a non-fixed length and/or is asynchronous can be supplied to the first storing means, wherein the audio data supplied to and stored in the first storing means are transferred to the second storing means for the unit reproduction duration, and wherein successive addresses are arranged in the second storing means and the audio data are written to the successive addresses.

22. A reproducing apparatus for reproducing video data and audio data that are paired as growth rings, each growth ring corresponding to a reproduction time zone for a unit reproduction duration, the reproducing apparatus comprising:

first storing means for storing audio data read from the disc-shaped recording medium for the unit reproduction duration; and second storing means for storing audio data, the audio data being read as samples from the second storing means, wherein audio data stored in the first storing means is transferred for the unit reproduction duration to the second storing means such that any gaps in the audio data are removed and the audio data stored in the second storing means appears as a continuous sequence of audio samples, and such that the audio data stored in the second storing means can be reproduced at a non-normal reproduction speed with audible discontinuity occurring only at points where audio programs interface, wherein said disc-shaped recording medium has two types of audio data stored thereon, main audio data and sub audio data, said sub audio data being audio data that is compressed with a higher compression ration than said main audio data, wherein upon reproduction from said disc-shaped recording medium said main audio data is reproduced and when a non-correctable error is detected in said main audio data, said sub audio data is reproduced in lieu of said main audio data, wherein switching between said main audio data and said sub audio data is accomplished by cross-fading.

23. A reproducing apparatus for reproducing video data and audio data that are paired as growth rings, each growth ring corresponding to a reproduction time zone for a unit reproduction duration, the reproducing apparatus comprising:

first storing means for storing audio data read from the disc-shaped recording medium for the unit reproduction duration; and second storing means for storing audio data, the audio data being read as samples from the second storing means, wherein audio data stored in the first storing means is transferred for the unit reproduction duration to the second storing means such that any gaps in the audio data are removed and the audio data stored in the second storing means appears as a continuous sequence of audio samples, and such that the audio data stored in the second storing means can be reproduced at a non-normal reproduction speed with audible discontinuity occurring only at points where audio programs interface, wherein said disc-shaped recording medium has two types of audio data stored thereon, main audio data and sub audio data, said sub audio data being audio data that is compressed with a higher compression ration than said main audio data, wherein upon variable speed reproduction from said disc-shaped recording medium said main audio data is reproduced until the difference between the reproduction speed and the normal reproduction speed exceeds a predetermined amount, and when the difference between the reproduction speed and the normal reproduction speed exceeds said predetermined amount said sub audio data is reproduced in lieu of said main audio.

24. The reproducing apparatus as set forth in claim 23, wherein switching between said main audio data and said sub audio data is accomplished by cross-fading.

* * * * *